US012522155B2

(12) United States Patent
Seon

(10) Patent No.: US 12,522,155 B2
(45) Date of Patent: Jan. 13, 2026

(54) VEHICLE UNDERCOVER STRUCTURE

(71) Applicants: Hyundai Motor Company, Seoul (KR); Kia Corporation, Seoul (KR)

(72) Inventor: Dong Ku Seon, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 894 days.

(21) Appl. No.: 17/745,353

(22) Filed: May 16, 2022

(65) Prior Publication Data

US 2023/0063716 A1 Mar. 2, 2023

(30) Foreign Application Priority Data

Aug. 27, 2021 (KR) .................. 10-2021-0114282

(51) Int. Cl.
*B60R 13/08* (2006.01)
*B62D 25/20* (2006.01)

(52) U.S. Cl.
CPC .......... *B60R 13/0861* (2013.01); *B62D 25/20* (2013.01); *B60R 2013/0807* (2013.01); *B62D 25/2009* (2013.01)

(58) Field of Classification Search
CPC ........ B60R 13/0861; B60R 2013/0807; B62D 25/20; B62D 25/2009
See application file for complete search history.

(56) References Cited

U.S. PATENT DOCUMENTS

| 4,060,142 | A  | * | 11/1977 | Abe .................... | B60R 13/0861 |
| | | | | | 181/204 |
| 4,114,714 | A  | * | 9/1978 | Fachbach ............ | B60R 13/0861 |
| | | | | | 181/204 |
| 11,084,544 | B2 | * | 8/2021 | Nishida ................ | B62D 25/16 |
| 11,254,267 | B2 | * | 2/2022 | Seon .................... | B60R 13/0861 |
| 11,420,576 | B2 | * | 8/2022 | Nishida ................ | B60R 13/0861 |
| 11,548,374 | B2 | * | 1/2023 | Yamauchi ............ | B60R 13/0861 |
| 11,964,618 | B2 | * | 4/2024 | Ambo .................... | B62D 37/02 |
| 2010/0143695 | A1 | * | 6/2010 | Ogawa .................. | B32B 5/026 |
| | | | | | 156/242 |
| 2023/0063716 | A1 | * | 3/2023 | Seon .................... | B62D 21/09 |
| 2024/0010279 | A1 | * | 1/2024 | Seon .................... | B62D 25/2072 |

FOREIGN PATENT DOCUMENTS

| DE | 19534972 A1 | * | 3/1997 | ............ B60R 13/08 |
| WO | WO-2013083896 A1 | * | 6/2013 | ............ B60G 7/02 |

\* cited by examiner

*Primary Examiner* — Jacob B Meyer
(74) *Attorney, Agent, or Firm* — Morgan Lewis & Bockius LLP

(57) ABSTRACT

A vehicle undercover structure, includes a vehicle body frame including a first side rail and a second side rail spaced from each other in a width direction of a vehicle; a front undercover mounted on the front of the vehicle body frame; a rear undercover mounted on the rear of the vehicle body frame; and a main undercover disposed between the front undercover and the rear undercover, wherein the main undercover covers a moving component which is movable between an upper limit position and a lower limit position on the vehicle body frame.

20 Claims, 19 Drawing Sheets

VEHICLE UNDERCOVER STRUCTURE

CROSS-REFERENCE TO RELATED APPLICATION

The present application claims priority to Korean Patent Application No. 10-2021-0114282, filed on Aug. 27, 2021, the entire contents of which is incorporated herein for all purposes by this reference.

BACKGROUND OF THE PRESENT DISCLOSURE

Field of the Present Disclosure

The present disclosure relates to a vehicle undercover structure, and more particularly, to a vehicle undercover structure capable of improving watertightness and electrical safety with respect to connectors of electric/electronic components mounted on a vehicle frame.

Description of Related art

A vehicle includes a vehicle body frame supporting a vehicle body, and the vehicle body frame includes a pair of side rails extending in a longitudinal direction of the vehicle.

In some vehicles, various vehicle components may be mounted on the vehicle body frame. For example, a truck includes a truck frame supporting a vehicle body, and the truck frame has a pair of side rails extending in a longitudinal direction of the truck and spaced from each other in a width direction of the truck. Each side rail may be a C-shaped beam including a web having a predetermined height and a pair of flanges formed on a top end portion and a bottom end portion of the web. Furthermore, the truck frame may have at least one crossmember connecting the side rails, and various vehicle components may be mounted on the truck frame.

For example, an electric powertrain system and a suspension system may be mounted on the truck frame of a fuel cell truck. The electric powertrain system of the fuel cell truck includes a fuel cell power module or power module complete, an air compressor (ACP), and a blowing power control unit (BPCU). The air suspension system of the fuel cell truck includes an axle extending between the pair of side rails in the width direction of the vehicle, a pair of air springs mounted on both end portions of the axle, and a pair of suspension arms connected to the pair of air springs, respectively. The air suspension system of the fuel cell truck includes a lateral rod extending between the pair of side rails in the width direction of the vehicle. One end portion of the lateral rod may be pivotally connected to any one of the pair of side rails through a bracket, and the other end portion of the lateral rod may be pivotally connected to any one of the pair of suspension arms. Accordingly, the lateral rod may move upwards and downwards along a predetermined movement path between the pair of side rails.

An undercover for protecting the bottom portion of various electric/electronic components such as powertrain components may be mounted to the truck frame. The undercover may be located under the truck frame. The undercover may prevent foreign objects, moisture, etc. from entering the electric/electronic components. The undercover may have a tunnel shape surrounding the electric/electronic components exposed under the truck frame, and the undercover may be mounted on the truck frame through a plurality of mounting brackets.

The electric/electronic components may have connectors to which cables for supply of electrical energy are connected. When moisture enters the connectors of the electric/electronic components, it may cause electric short circuits in the electric/electronic components, which may be a hindrance to the operation of the vehicle.

When the undercover is not disposed under the lateral rod moving upwards and downwards between the pair of side rails, it is highly likely for moisture to enter the connectors of the electric/electronic components adjacent to the lateral rod. When moisture enters the connectors of the electric/electronic components, it may cause electric short circuits in the electric/electronic components, which may be a hindrance to the operation of the vehicle.

Furthermore, when the undercover is lower than a lower limit position of the moving component which is movable upwards and downwards, it may fail to meet the vehicle's minimum ground clearance for obstacle avoidance conditions.

The information disclosed in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle undercover structure designed to cover a moving component which is movable along a predetermined movement path on a vehicle body frame, improving watertightness and electrical safety with respect to electric/electronic components mounted on the vehicle body frame.

According to an aspect of the present disclosure, a vehicle undercover structure may include: a vehicle body frame including a first side rail and a second side rail spaced from each other in a width direction of a vehicle; and a main undercover covering a moving component which is movable between an upper limit position and a lower limit position on the vehicle body frame.

As the main undercover covers the moving component, various vehicle components mounted on the vehicle body frame may be safely protected, and watertightness and electrical safety with respect to connectors of electric/electronic components adjacent to the moving component may be secured.

The vehicle undercover structure may further include a front cross plate located in front of the moving component, and a rear cross plate located behind the moving component. The front cross plate and the rear cross plate may extend in the width direction of the vehicle, and the upper limit position of the moving component may be lower than a top surface of the front cross plate and a top surface of the rear cross plate. The main undercover may be mounted on the front cross plate and the rear cross plate through a plurality of main mounting brackets.

The main undercover may be stably mounted between the front cross plate and the rear cross plate through the plurality of main mounting brackets. As the main undercover is disposed above the moving component, it may be prevented from interfering with the moving component.

A first end portion of the front cross plate and a first end portion of the rear cross plate may be mounted on the first side rail through a first bracket, and a second end portion of the front cross plate and a second end portion of the rear cross plate may be mounted on the second side rail through a second bracket.

As the end portions of the front cross plate and the end portions of the rear cross plate may be mounted on the first side rail and the second side rail of the vehicle body frame, the main undercover may be securely supported to the vehicle body frame through the front cross plate and the rear cross plate.

The plurality of main mounting brackets may include a first main mounting bracket mounted adjacent to the first end portion of the front cross plate, a second main mounting bracket mounted adjacent to the first end portion of the rear cross plate, a third main mounting bracket mounted adjacent to the second end portion of the front cross plate, and a fourth main mounting bracket mounted adjacent to the second end portion of the rear cross plate.

As the plurality of main mounting brackets are mounted on the front cross plate and the rear cross plate, the main undercover may be stably mounted on the front cross plate and the rear cross plate, preventing moisture from entering the connectors of electric/electronic components adjacent to the moving component.

The main undercover may include a bottom wall and two mounting walls connected to both sides of the bottom wall. The main undercover may have a raised portion which is raised upwardly from the bottom wall so that a bottom surface of the raised portion may not interfere with a top portion of the moving component. The raised portion may have a curved cross section corresponding to the top portion of the moving component, and accordingly the moving component may not contact or interfere with the bottom surface of the raised portion even when the moving component is in the upper limit position.

The first main mounting bracket may include a first mounting portion mounted on the front cross plate, a front extension portion extending from a bottom end portion of the first mounting portion toward the front of the vehicle, and a rear extension portion extending from a top end portion of the first mounting portion toward the rear of the vehicle. The rear extension portion of the first main mounting bracket may be located higher than the top surface of the front cross plate.

The second main mounting bracket may include a second mounting portion mounted on the rear cross plate, and a front extension portion extending from a top end portion of the second mounting portion toward the front of the vehicle. The front extension portion of the second main mounting bracket may be located higher than the top surface of the rear cross plate.

The first main mounting bracket may face the second main mounting bracket in a longitudinal direction of the vehicle. A first mounting wall of the main undercover may be joined to the rear extension portion of the first main mounting bracket and the front extension portion of the second main mounting bracket.

The third main mounting bracket may include a third mounting portion mounted on the front cross plate, and a rear extension portion extending from a top end portion of the third mounting portion toward the rear of the vehicle. The rear extension portion of the third main mounting bracket may be located higher than the top surface of the front cross plate.

The fourth main mounting bracket may include a fourth mounting portion mounted on the rear cross plate, and a front extension portion extending from a top end portion of the fourth mounting portion toward the front of the vehicle.

The front extension portion of the fourth main mounting bracket may be located higher than the top surface of the rear cross plate.

The third main mounting bracket may face the fourth main mounting bracket in the longitudinal direction of the vehicle. A second mounting wall of the main undercover may be joined to the rear extension portion of the third main mounting bracket and the front extension portion of the fourth main mounting bracket.

The vehicle undercover structure may further include an auxiliary undercover located in front of the main undercover, and the auxiliary undercover may be mounted on the first main mounting bracket.

The auxiliary undercover may include a bottom wall, a front wall facing the front of the vehicle, and a sidewall facing a side of the vehicle. The bottom wall of the auxiliary undercover may be joined to the front extension portion of the first main mounting bracket. The main undercover and the auxiliary undercover may be mounted together on the first main mounting bracket, and thus the main undercover and the auxiliary undercover may be stably supported to the front cross plate and the rear cross plate through the first main mounting bracket.

The first main mounting bracket may further include a cut-out portion provided on the front extension portion of the first main mounting bracket, and a bent portion provided at the bottom end portion of the first mounting portion. The bent portion may have a 'U'-shaped cross section, the front extension portion of the first main mounting bracket may be joined to the first mounting portion through the bent portion to form a unitary one-piece structure, and the front extension portion of the first main mounting bracket may be located higher than a bottom surface of the bent portion. Accordingly, stiffness of the first main mounting bracket may be increased by the bent portion.

The auxiliary undercover may further include a recessed wall which is recessed downwardly from the bottom wall. A distance between the recessed wall and the bottom wall may be defined by the bent portion, and the recessed wall may be aligned with the cut-out portion of the first main mounting bracket. Accordingly, the cut-out portion of the first main mounting bracket and the recessed wall is configured as a drainage channel through which moisture flows downwards. For example, a plurality of bolts may fasten the bottom wall of the auxiliary undercover and the front extension portion of the first main mounting bracket. A head of each bolt may be covered by the recessed wall, and accordingly the head of the bolt may be prevented from protruding downwardly from the auxiliary undercover.

The auxiliary undercover may further include a recessed edge portion provided on one edge portion of the front wall, and the recessed edge portion may extend in a height direction of the vehicle. Accordingly, stiffness of the auxiliary undercover may be increased by the recessed edge portion.

The auxiliary undercover may further include a lateral raised portion which is raised from the sidewall toward the outside of the auxiliary undercover, and the lateral raised portion may be continuously connected to the bottom wall of the auxiliary undercover at a right angle. Accordingly, stiffness of the auxiliary undercover may be increased by the lateral raised portion.

The vehicle undercover structure may further include a front undercover located in front of the main undercover. The front undercover may be mounted on the vehicle body frame through a plurality of front mounting brackets. The front undercover may include a bottom wall and two sidewalls connected to both sides of the bottom wall. Each front mounting bracket may extend downwardly from the vehicle body frame, and accordingly the bottom wall of the front undercover may be located below the vehicle body frame. As the front undercover is mounted on the vehicle body frame through the plurality of front mounting brackets, various components disposed on the front of the vehicle body frame may be entirely covered by the front undercover.

The vehicle undercover structure may further include a rear undercover located behind the main undercover. The rear undercover may be mounted on the vehicle body frame through a plurality of rear mounting brackets. The rear undercover may include a bottom wall and two sidewalls connected to both sides of the bottom wall. Each rear mounting bracket may extend downwardly from the vehicle body frame, and accordingly the bottom wall of the rear undercover may be located below the vehicle body frame. As the rear undercover is mounted on the vehicle body frame through the plurality of rear mounting brackets, various components disposed on the rear of the vehicle body frame may be entirely covered by the rear undercover.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
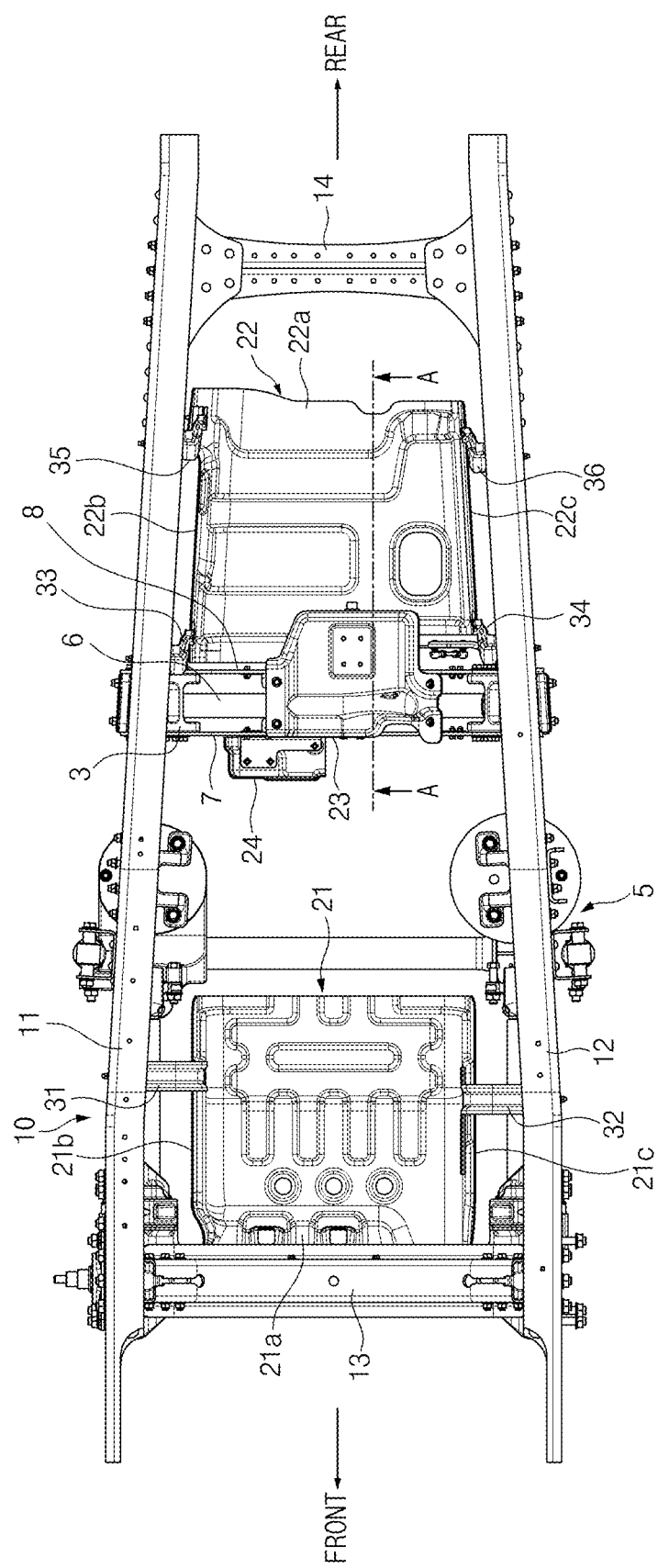
FIG. 1 illustrates a plan view of a vehicle undercover structure according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In the drawings, the same reference numerals will be used throughout to designate the same or equivalent elements. Furthermore, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle undercover structure according to an exemplary embodiment of the present disclosure may include a vehicle body frame 10, and a plurality of undercovers 21, 22, 23, and 24 mounted on the vehicle body frame 10.

The vehicle body frame 10 may include a first side rail 11 and a second side rail 12 spaced from each other in a width direction of the vehicle. The first side rail 11 and the second side rail 12 may face each other.

Figure 2:
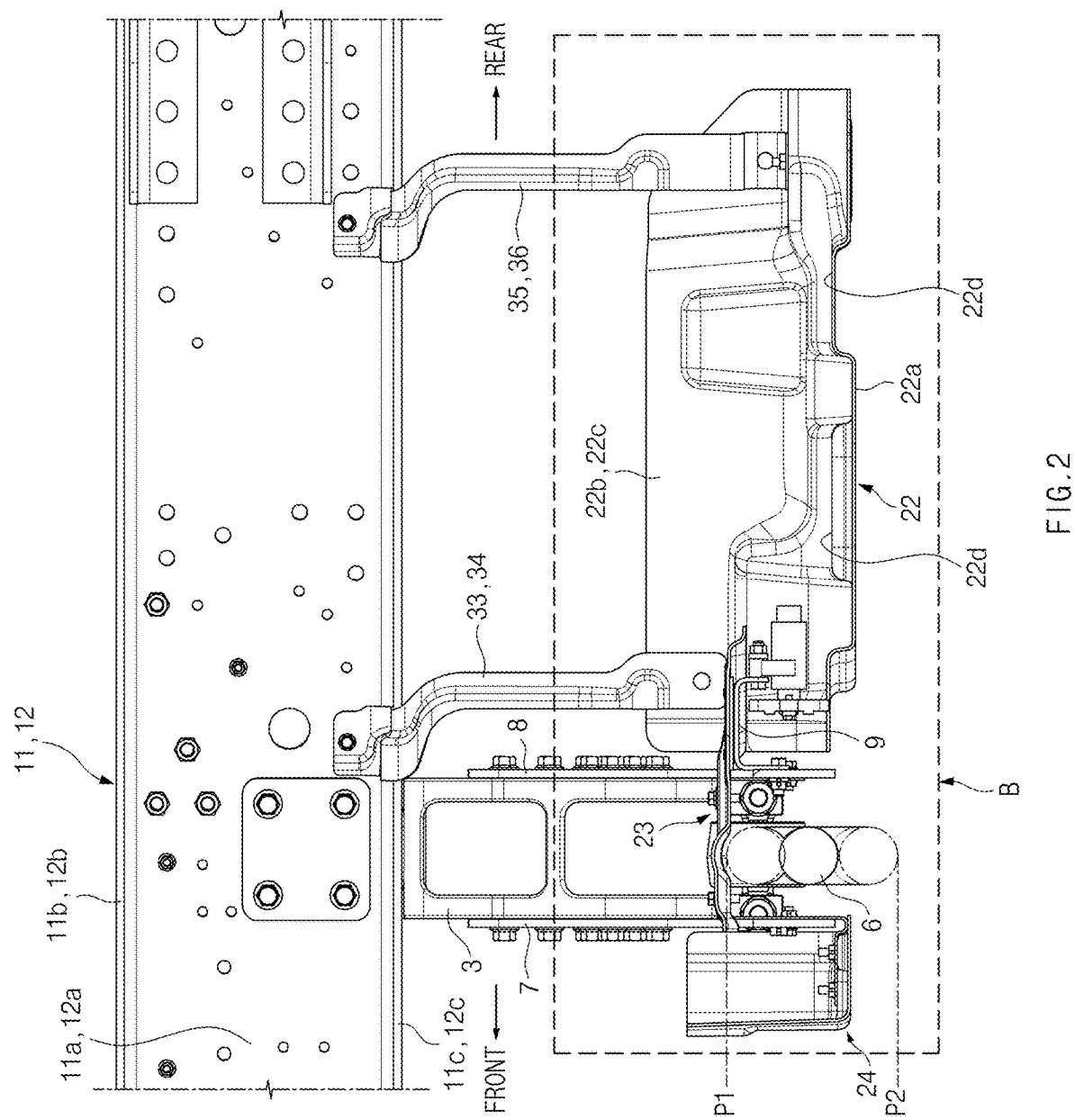
FIG. 2 illustrates a cross-sectional view, taken along line A-A of FIG. 1.

As illustrated in FIG. 1, the first side rail 11 may be located on the left side of the vehicle, and the first side rail 11 may extend in a longitudinal direction of the vehicle. The first side rail 11 may be a beam including a C-shaped cross section or an I-shaped cross section. Referring to FIG. 2, the first side rail 11 may include a first web 11a extending in a vertical direction (a height direction of the vehicle), a first top flange 11b formed on a top end portion of the first web 11a, and a first bottom flange 11c formed on a bottom end portion of the first web 11a.

As illustrated in FIG. 1, the second side rail 12 may be located on the right side of the vehicle, and the second side rail 12 may extend in the longitudinal direction of the vehicle. The second side rail 12 may be a beam including a C-shaped cross section or an I-shaped cross section. Referring to FIG. 2, the second side rail 12 may include a second web 12a extending in the vertical direction (the height direction of the vehicle), a second top flange 12b formed on a top end portion of the second web 12a, and a second bottom flange 12c formed on a bottom end portion of the second web 12a.

A plurality of crossmembers 13 and 14 may connect the first side rail 11 and the second side rail 12. A front crossmember 13 may be located on the front of the vehicle body frame 10, and a rear crossmember 14 may be located on the rear of the vehicle body frame 10.

According to an exemplary embodiment of the present disclosure, the vehicle body frame 10 may be a frame of a truck. The vehicle body frame 10 may be a frame of a fuel cell truck.

Various components may be mounted on the vehicle body frame 10. Various components may be disposed between the front crossmember 13 and the rear crossmember 14. For example, various components may be at least some components of an electric powertrain system of the fuel cell truck and/or at least some components of a suspension system of the fuel cell truck.

Figure 18:
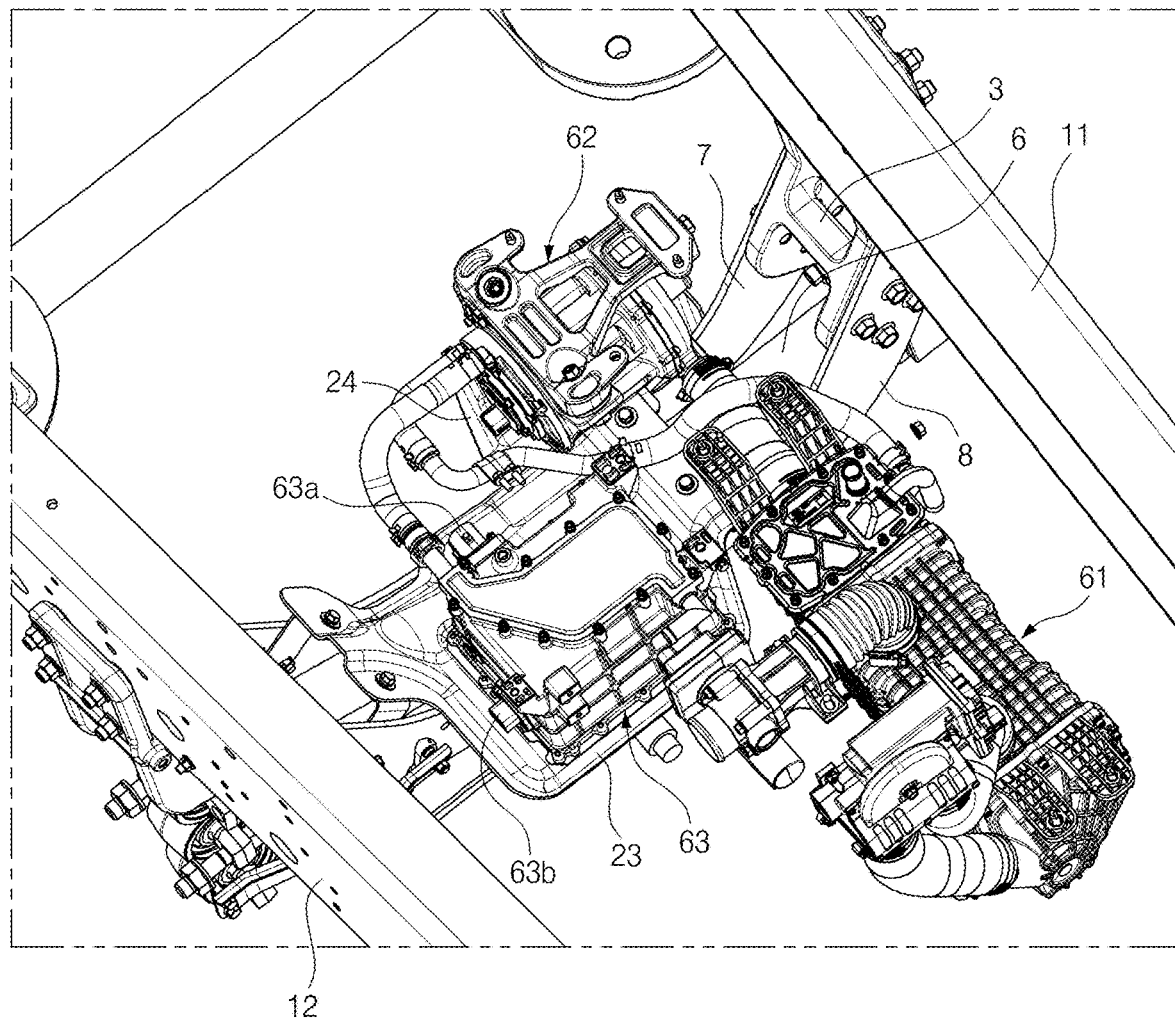
FIG. 18 illustrates a perspective view of the arrangement of a fuel cell power module, an air compressor, and a blowing power control unit on a vehicle undercover structure according to an exemplary embodiment of the present disclosure.
Figure 19:
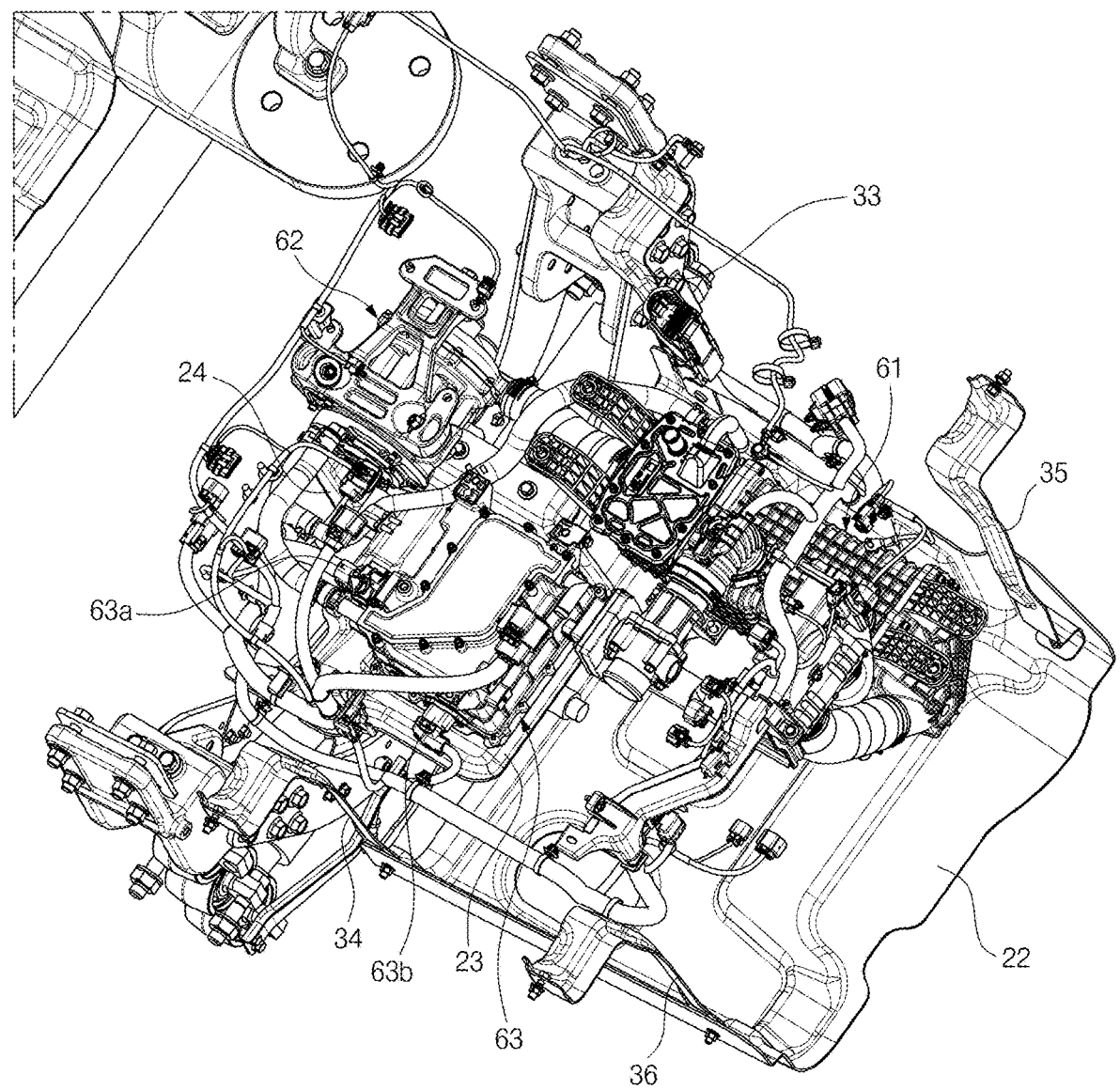
FIG. 19 illustrates a perspective view of a state in which a fuel cell power module and an air compressor are covered by a rear undercover, a main undercover, and an auxiliary undercover in a vehicle undercover structure according to an exemplary embodiment of the present disclosure.

Referring to FIGS. 18 and 19, the electric powertrain system of the fuel cell truck may include a fuel cell power module or power module complete 61, an air compressor (ACP) 62 compressing air supplied to a fuel cell stack, and a blowing power control unit (BPCU) 63 controlling the driving of an air blower and a cooling pump.

Referring to FIG. 1, an air suspension system 5 of the fuel cell truck may include an axle extending between the pair of side rails in the width direction of the vehicle, a pair of air springs mounted on both end portions of the axle, and a pair of suspension arms connected to the pair of air springs, respectively. The air suspension system 5 may include a lateral rod 6 extending between the pair of side rails 11 and 12 in the width direction of the vehicle.

Figure 5:
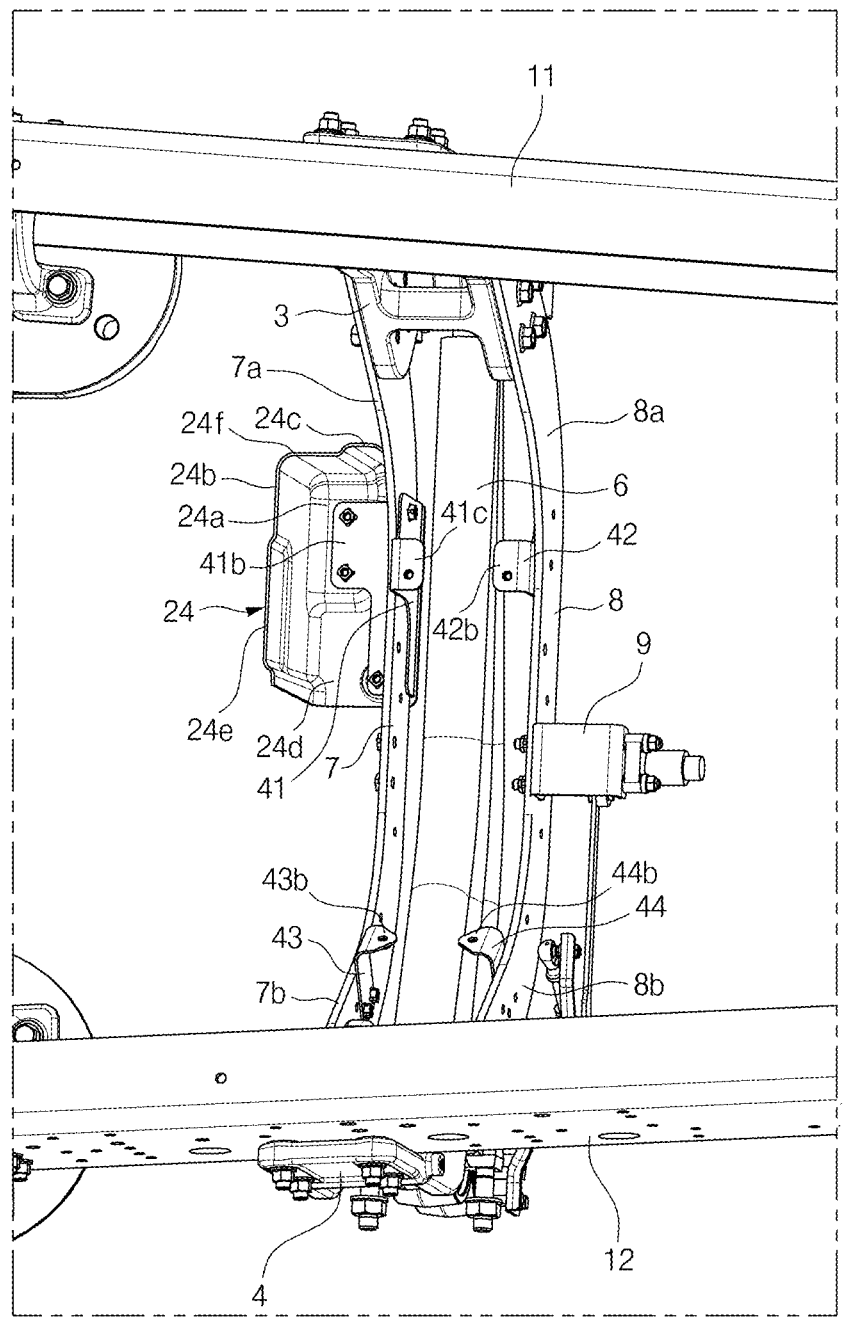
FIG. 5 illustrates an enlarged view of portion C of FIG. 4.
Figure 12:
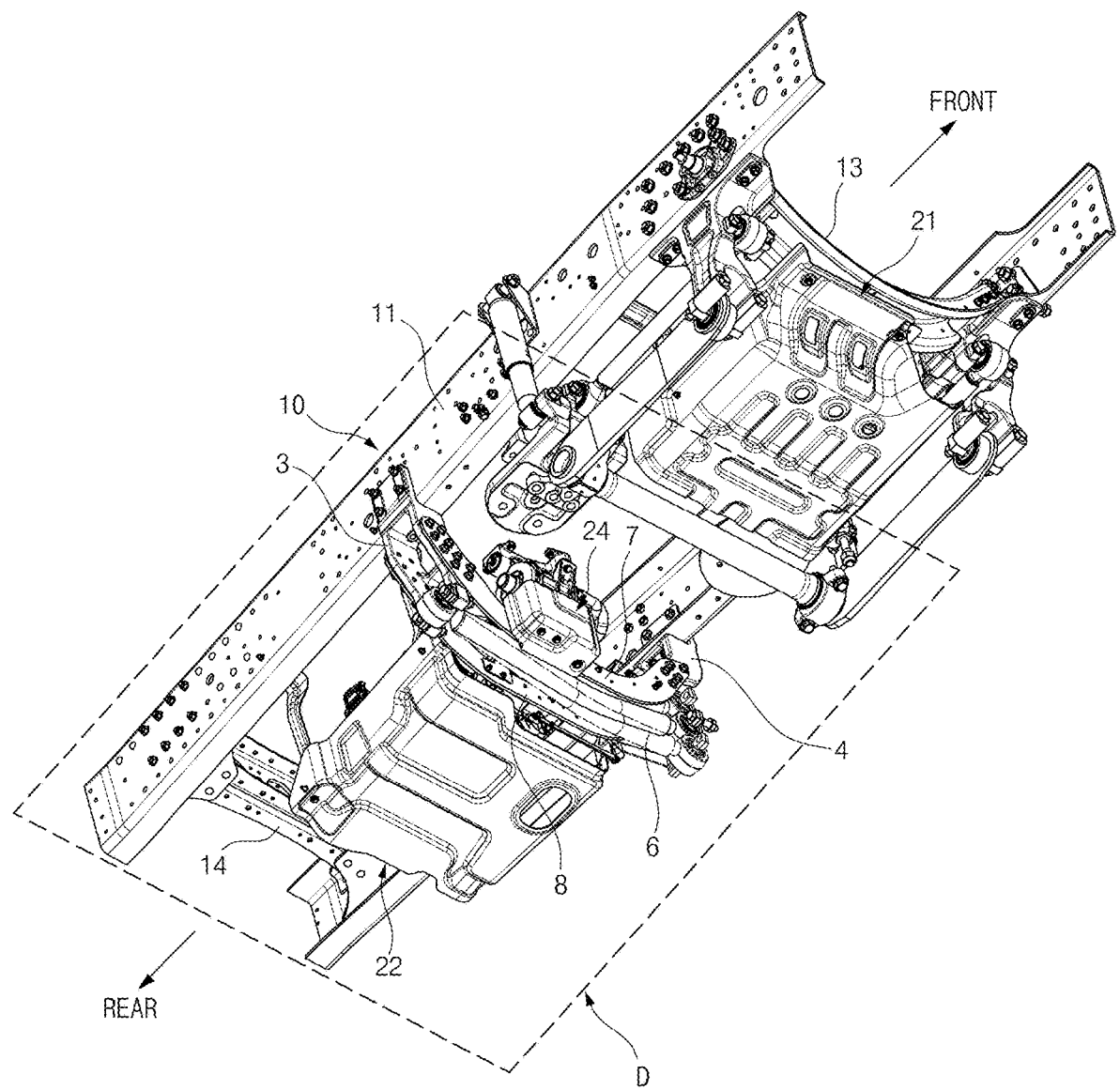
FIG. 12 illustrates a bottom perspective view of a vehicle undercover structure according to an exemplary embodiment of the present disclosure.
Figure 13:
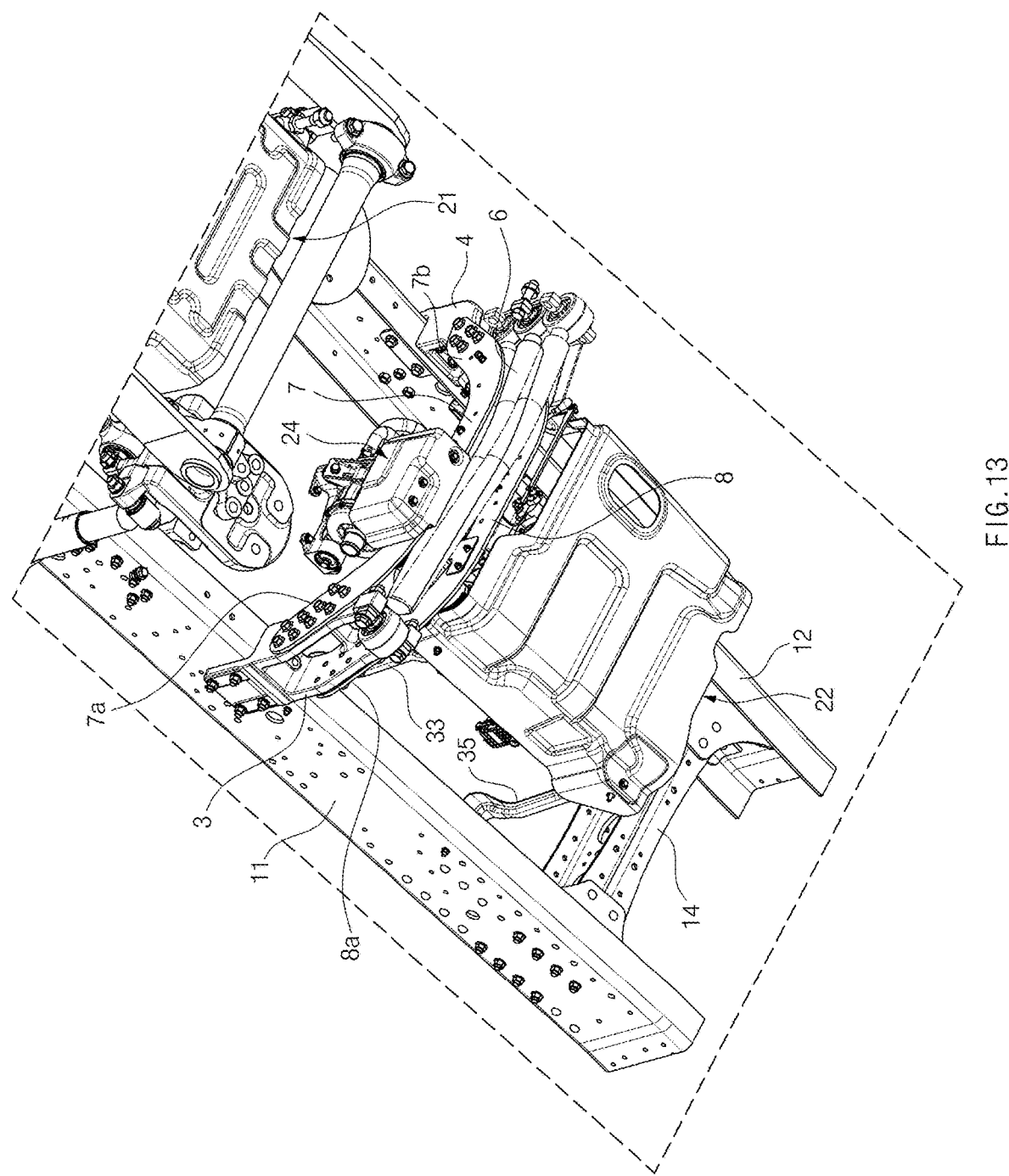
FIG. 13 illustrates an enlarged view of portion D of FIG. 12.

Referring to FIGS. 5 and 12, a first end portion of the lateral rod 6 may be pivotally connected to the first side rail 11 through a first bracket 3, and a second end portion of the lateral rod 6 may be pivotally connected to a suspension arm of the air suspension system adjacent to the second side rail 12. Accordingly, the lateral rod 6 may move (pivot) around the first end portion upwards and downwards along a predetermined movement path between the pair of side rails.

The vehicle undercover structure according to an exemplary embodiment of the present disclosure may include one or more cross plates 7 and 8 adjacent to a moving component such as the lateral rod 6. One or more cross plates 7 and 8 may extend in the width direction of the vehicle, and be mounted between the pair of side rails 11 and 12. Referring to FIG. 1, FIG. 2, FIG. 3, FIG. 4, and FIG. 5, the vehicle undercover structure according to an exemplary embodiment of the present disclosure may include a front cross plate 7 located in front of the lateral rod 6, and a rear cross plate 8 located behind the lateral rod 6. The front cross plate 7 may be spaced from the moving component such as the lateral rod 6 toward the front of the vehicle, and the rear cross plate 8 may be spaced from the moving component such as the lateral rod 6 toward the rear of the vehicle. Each of the front cross plate 7 and the rear cross plate 8 may extend in the width direction of the vehicle.

The front cross plate 7 may have a front surface facing the front of the vehicle and a rear surface facing the rear of the vehicle. The rear cross plate 8 may have a front surface facing the front of the vehicle and a rear surface facing the rear of the vehicle. The rear surface of the front cross plate 7 may face the front surface of the rear cross plate 8.

Referring to FIG. 5, a first end portion 7a of the front cross plate 7 and a first end portion 8a of the rear cross plate 8 may be mounted on the first side rail 11 through the first bracket 3, and the first end portion 7a of the front cross plate 7 and the first end portion 8a of the rear cross plate 8 may be curved toward the first side rail 11.

Referring to FIG. 5, a second end portion 7b of the front cross plate 7 and a second end portion 8b of the rear cross plate 8 may be mounted on the second side rail 12 through a second bracket 4, and the second end portion 7b of the front cross plate 7 and the second end portion 8b of the rear cross plate 8 may be curved toward the second side rail 12.

Each of the front cross plate 7 and the rear cross plate 8 may be a thin plate of which thickness is relatively less than width and length thereof. The front cross plate 7 and the rear cross plate 8 may face each other with the moving component such as the lateral rod 6 interposed therebetween. The front cross plate 7 and the rear cross plate 8 may have the same shape and the same size. The front cross plate 7 and the rear cross plate 8 may have a cross-section flattened in the height direction of the vehicle.

As the moving component such as the lateral rod 6 moves upwards and downwards along the predetermined movement path between the front cross plate 7 and the rear cross plate 8, the moving component may be protected by the front cross plate 7 and the rear cross plate 8. The moving component such as the lateral rod 6 may move between an upper limit position and a lower limit position. The upper limit position of the moving component may be lower than a top surface of the front cross plate 7 and a top surface of the rear cross plate 8, and the lower limit position of the moving component may be higher than a bottom surface of the front cross plate 7 and a bottom surface of the rear cross plate 8.

Referring to FIG. 1, the plurality of undercovers 21, 22, 23, and 24 may include a front undercover 21 mounted on the front of the vehicle body frame 10, a rear undercover 22 mounted on the rear of the vehicle body frame 10, and a main undercover 23 disposed between the front undercover 21 and the rear undercover 22.

The front undercover 21 may be located in front of the main undercover 23, and the front undercover 21 may be mounted on the first and second side rails 11 and 12 of the vehicle body frame 10 through a plurality of front mounting brackets 31 and 32. The front undercover 21 may include a bottom wall 21*a* and two sidewalls 21*b* and 21*c* connected to both sides of the bottom wall 21*a*. For example, the two sidewalls 21*b* and 21*c* may include a first sidewall 21*b* facing the left side of the vehicle, and a second sidewall 21*c* facing the right side of the vehicle. The plurality of front mounting brackets 31 and 32 may include a first front mounting bracket 31 connecting the first sidewall 21*b* to the first side rail 11, and a second front mounting bracket 32 connecting the second sidewall 21*c* to the second side rail 12. That is, the front undercover 21 may be mounted on the first and second side rails 11 and 12 through the two front mounting brackets 31 and 32. The front undercover 21 may cover various vehicle components disposed on the front of the vehicle body frame 10.

A bottom end portion of each of the front mounting brackets 31 and 32 may be joined to the corresponding sidewall of the front undercover 21 through a fastener (bolt), and a top end portion of each of the front mounting brackets 31 and 32 may be joined to the web of the corresponding side rail through a fastener (bolt). The bottom end portion of the first front mounting bracket 31 may be joined to the first sidewall 21*b* of the front undercover 21 through a bolt, and the top end portion of the first front mounting bracket 31 may be joined to the first web 11*a* of the first side rail 11 through a bolt. The bottom end portion of the second front mounting bracket 32 may be joined to the second sidewall 21*c* of the front undercover 21 through a bolt, and the top end portion of the second front mounting bracket 32 may be joined to the second web 12*a* of the second side rail 12 through a bolt.

The front mounting brackets 31 and 32 may extend downwardly from the corresponding side rails 11 and 12 of the vehicle body frame 10 toward the bottom portion of the vehicle, and accordingly the bottom wall 21*a* of the front undercover 21 may be located below the vehicle body frame 10.

The rear undercover 22 may be located behind the main undercover 23, and the rear undercover 22 may be mounted on the first and second side rails 11 and 12 of the vehicle body frame 10 through a plurality of rear mounting brackets 33, 34, 35, and 36. The rear undercover 22 may include a bottom wall 22*a* and two sidewalls 22*b* and 22*c* connected to both sides of the bottom wall 22*a*. For example, the two sidewalls 22*b* and 22*c* may include a first sidewall 22*b* facing the left side of the vehicle, and a second sidewall 22*c* facing the right side of the vehicle. The plurality of rear mounting brackets 33, 34, 35, and 36 may include two first rear mounting brackets 33 and 35 connecting the first sidewall 22*b* to the first side rail 11, and two second rear mounting brackets 34 and 36 connecting the second sidewall 22*c* to the second side rail 12.

Figure 3:
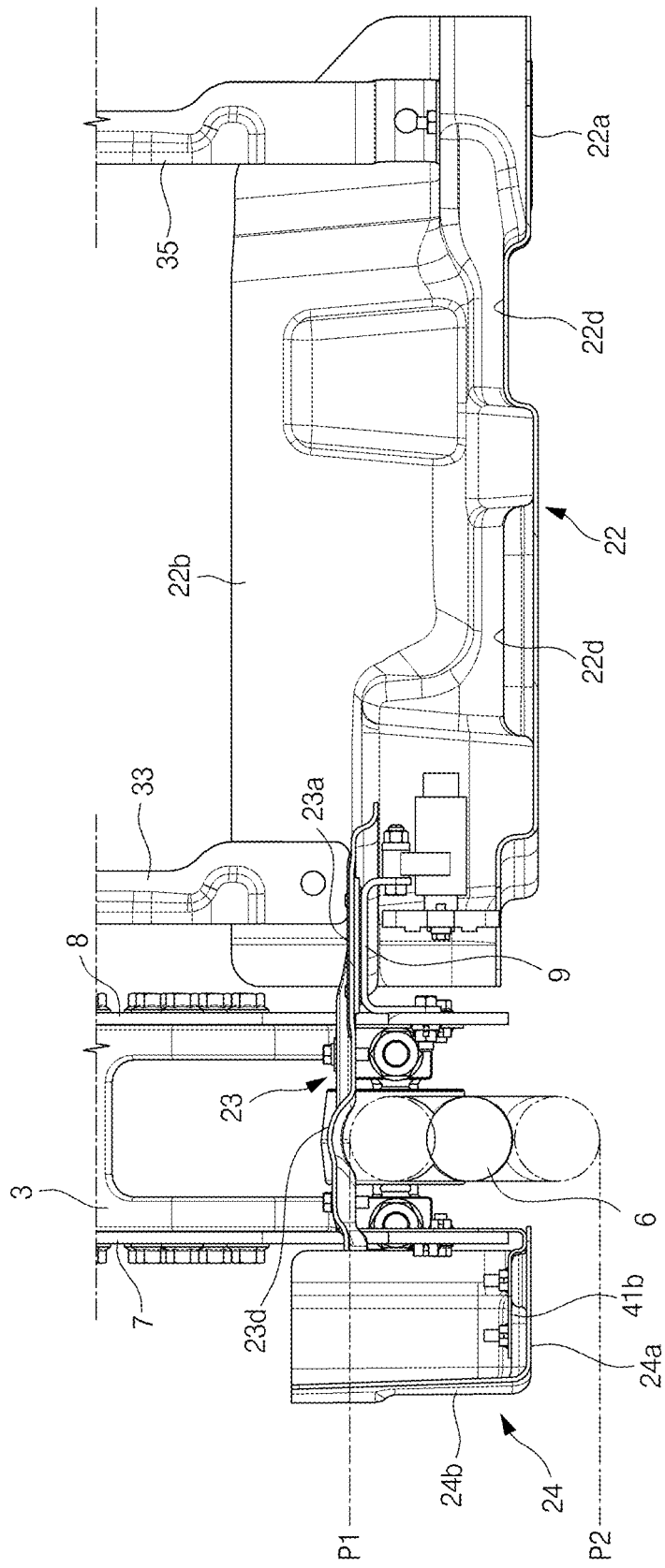
FIG. 3 illustrates an enlarged view of portion B of FIG. 2.
Figure 4:
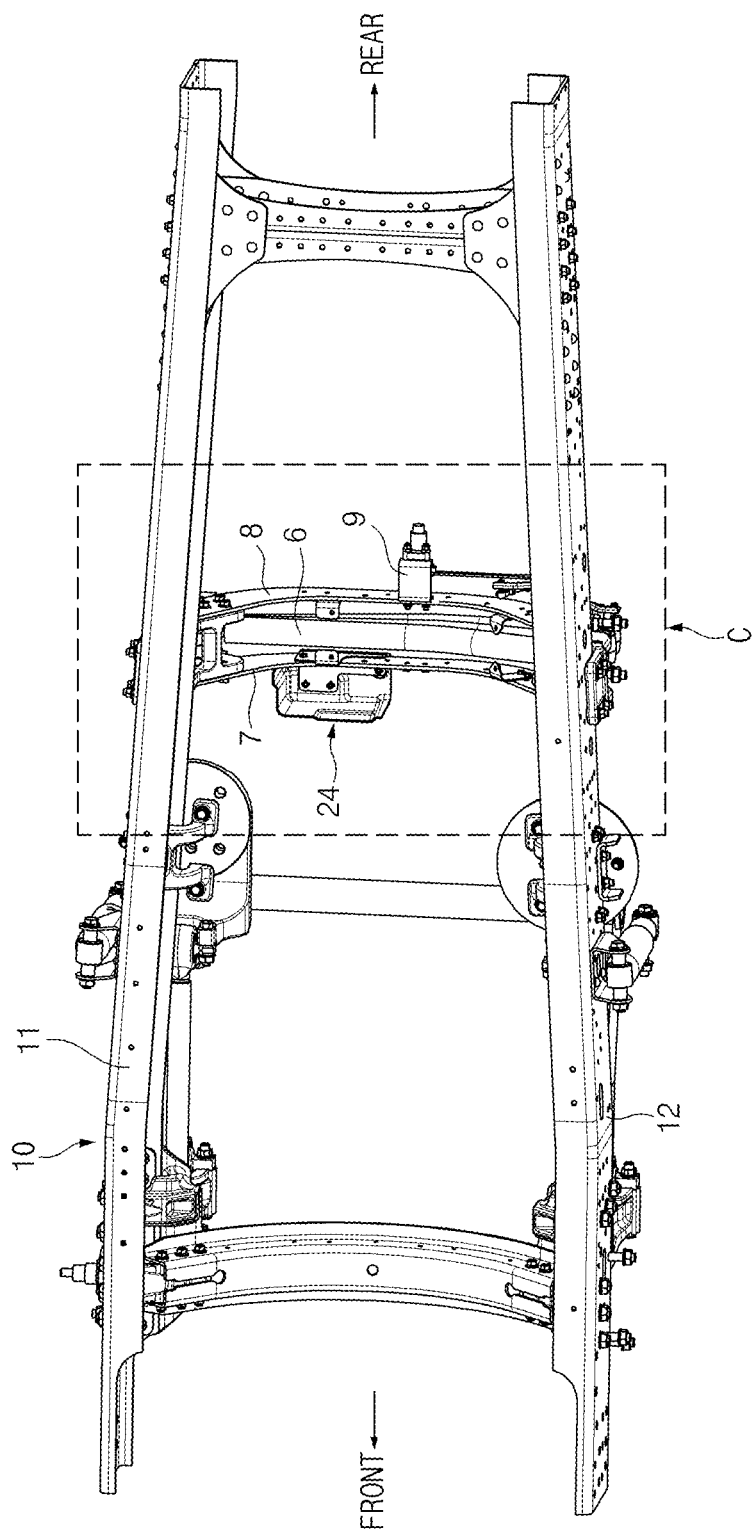
FIG. 4 illustrates a perspective view of an auxiliary undercover mounted on a vehicle undercover structure according to an exemplary embodiment of the present disclosure, from which a front undercover, a rear undercover, and a main undercover are removed.

A bottom end portion of each of the rear mounting brackets 33, 34, 35, and 36 may be joined to the corresponding sidewall of the rear undercover 22 through a fastener (bolt), and a top end portion of each of the rear mounting brackets 33, 34, 35, and 36 may be joined to the web of the corresponding side rail through a fastener (bolt). Referring to FIG. 3, the bottom end portion of each of the first rear mounting brackets 33 and 35 may be joined to the first sidewall 22*b* of the rear undercover 22 through a fastener (bolt). Referring to FIG. 2, the top end portion of each of the first rear mounting brackets 33 and 35 may be joined to the first web 11*a* of the first side rail 11 through a fastener (bolt). The bottom end portion of each of the second rear mounting brackets 34 and 36 may be joined to the second sidewall 22*c* of the rear undercover 22 through a fastener (bolt), and the top end portion of each of the second rear mounting brackets 34 and 36 may be joined to the second web 12*a* of the second side rail 12 through a fastener (bolt).

The rear mounting brackets 33, 34, 35, and 36 may extend downwardly from the corresponding side rails 11 and 12 of the vehicle body frame 10 toward the bottom portion of the vehicle, and accordingly the bottom wall 22*a* of the rear undercover 22 may be located below the vehicle body frame 10. The rear undercover 22 may cover various vehicle components disposed on the rear of the vehicle body frame 10. For example, as illustrated in FIG. 19, the fuel cell power module 61 of the electric powertrain system of the fuel cell truck may be mounted on the vehicle body frame 10 so that it may be covered by the rear undercover 22.

Referring to FIG. 1, FIG. 2, and FIG. 3, the main undercover 23 may be disposed between the front undercover 21 and the rear undercover 22. The main undercover 23 may be mounted on the front cross plate 7 and the rear cross plate 8 through a plurality of main mounting brackets 41, 42, 43, and 44.

Referring to FIG. 5, the plurality of main mounting brackets 41, 42, 43, and 44 may include a first main mounting bracket 41 mounted adjacent to the first end portion 7*a* of the front cross plate 7, a second main mounting bracket 42 mounted adjacent to the first end portion 8*a* of the rear cross plate 8, a third main mounting bracket 43 mounted adjacent to the second end portion 7*b* of the front cross plate 7, and a fourth main mounting bracket 44 mounted adjacent to the second end portion 8*b* of the rear cross plate 8.

Figure 6:
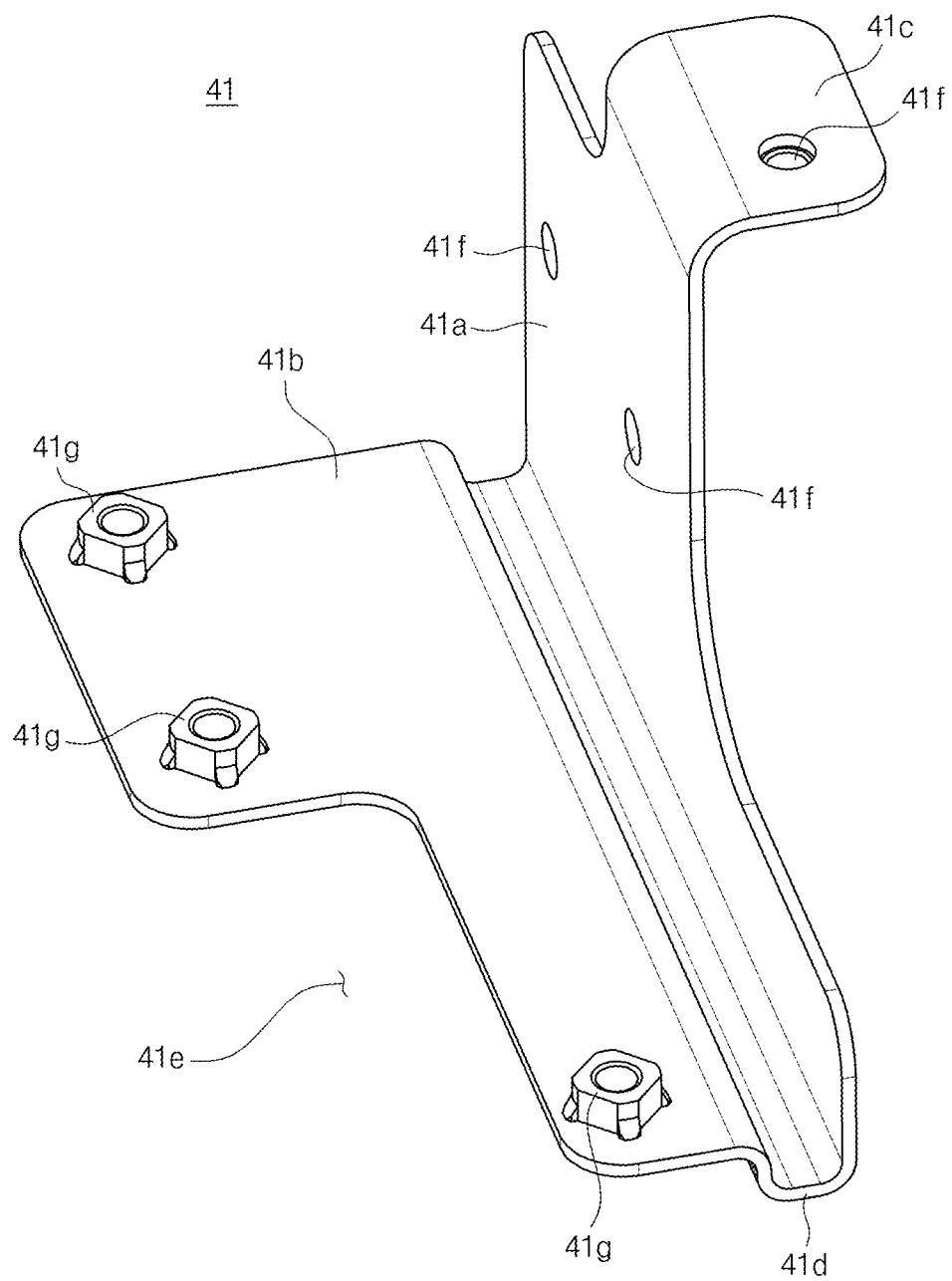
FIG. 6 illustrates a perspective view of a first main mounting bracket of a vehicle undercover structure according to an exemplary embodiment of the present disclosure.

Referring to FIG. 6, the first main mounting bracket 41 may include a first mounting portion 41*a* mounted on the front cross plate 7, a front extension portion 41*b* extending from the first mounting portion 41*a* toward the front of the vehicle, and a rear extension portion 41*c* extending from the first mounting portion 41*a* toward the rear of the vehicle.

The first mounting portion 41*a* may be flattened and extend in the height direction of the vehicle, and the first mounting portion 41*a* may be joined to a portion of the front cross plate 7 adjacent to the first end portion 7*a* of the front cross plate 7 using fasteners, welding, and/or the like.

As illustrated in FIG. 5, the front extension portion 41*b* may extend horizontally from a bottom end portion of the first mounting portion 41*a* toward the front undercover 21 in the longitudinal direction of the vehicle. That is, the front extension portion 41*b* may be perpendicular to the first mounting portion 41*a*. The front extension portion 41*b* may have a cut-out portion 41*e* including a predetermined area.

As illustrated in FIG. 5, the rear extension portion 41*c* may extend horizontally from a top end portion of the first mounting portion 41*a* toward the rear cross plate 8 in the longitudinal direction of the vehicle. That is, the rear extension portion 41*c* may be perpendicular to the first mounting portion 41*a*.

The rear extension portion 41c may be aligned with the top surface of the front cross plate 7 or be located higher than the top surface of the front cross plate 7.

The first main mounting bracket 41 may have a plurality of mounting holes 41f provided in the first mounting portion 41a, the front extension portion 41b, and the rear extension portion 41c, and a plurality of nuts 41g may be aligned with the plurality of mounting holes 41f, respectively. Each nut 41g may be welded to an edge portion of each mounting hole 41f.

The first main mounting bracket 41 may have a bent portion 41d provided at the bottom end portion of the first mounting portion 41a, and the bent portion 41d may have a 'U'-shaped cross section. The front extension portion 41b may be joined to the first mounting portion 41a through the bent portion 41d to form a unitary one-piece structure. The front extension portion 41b may be located higher than a bottom surface of the bent portion 41d. Stiffness of the first main mounting bracket 41 may be improved by the bent portion 41d.

Figure 7:
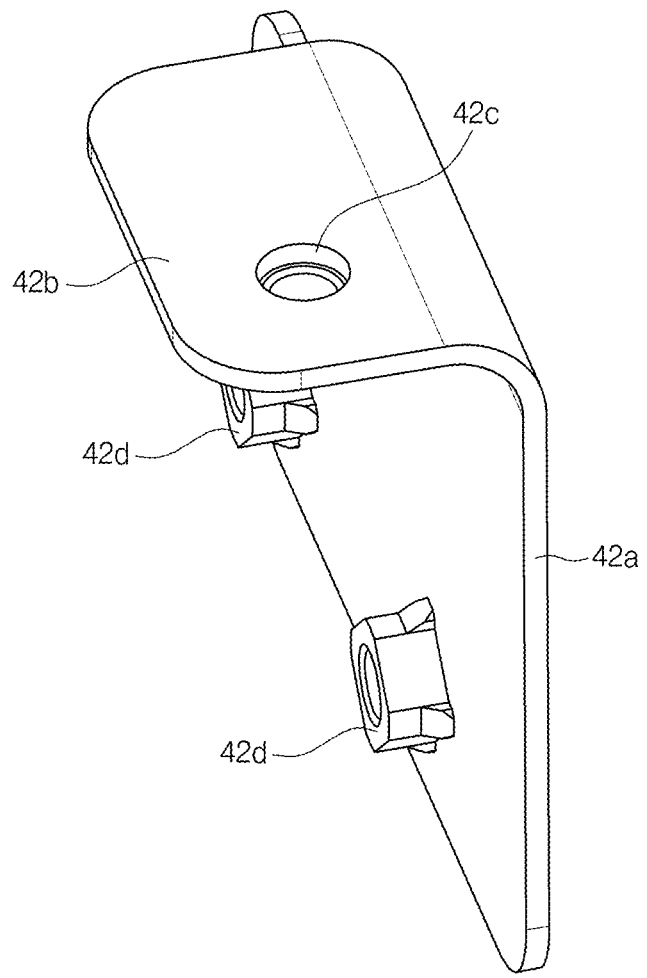
FIG. 7 illustrates a perspective view of a second main mounting bracket of a vehicle undercover structure according to an exemplary embodiment of the present disclosure.

Referring to FIG. 7, the second main mounting bracket 42 may include a second mounting portion 42a mounted on the rear cross plate 8, and a front extension portion 42b extending from the second mounting portion 42a toward the front of the vehicle.

The second mounting portion 42a may be flattened and extend in the height direction of the vehicle, and the second mounting portion 42a may be joined to a portion of the rear cross plate 8 adjacent to the first end portion 8a of the rear cross plate 8 using fasteners, welding, and/or the like.

As illustrated in FIG. 5, the front extension portion 42b may extend horizontally from a top end portion of the second mounting portion 42a toward the front undercover 21 in the longitudinal direction of the vehicle. That is, the front extension portion 42b may be perpendicular to the second mounting portion 42a.

The front extension portion 42b may be aligned with the top surface of the rear cross plate 8 or be located higher than the top surface of the rear cross plate 8.

The second main mounting bracket 42 may have a plurality of mounting holes 42c provided in the second mounting portion 42a and the front extension portion 42b, and a plurality of nuts 42d may be aligned with the plurality of mounting holes 42c, respectively. Each nut 42d may be welded to an edge portion of each mounting hole 42c.

Figure 8:
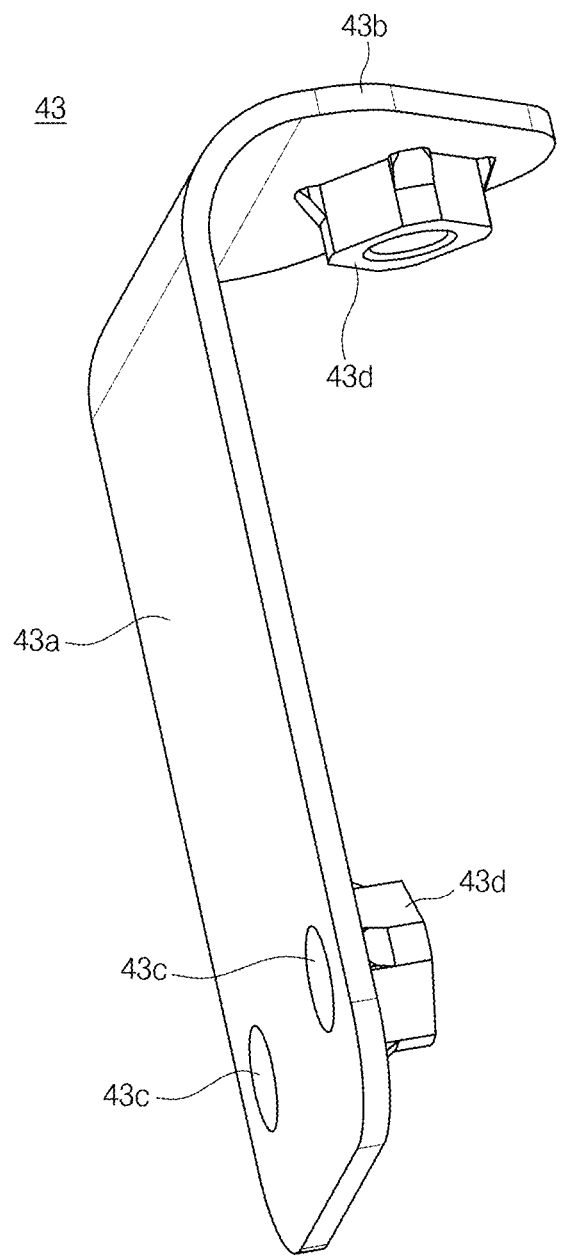
FIG. 8 illustrates a perspective view of a third main mounting bracket of a vehicle undercover structure according to an exemplary embodiment of the present disclosure.

Referring to FIG. 8, the third main mounting bracket 43 may include a third mounting portion 43a mounted on the front cross plate 7, and a rear extension portion 43b extending from the third mounting portion 43a toward the rear of the vehicle.

The third mounting portion 43a may be flattened and extend in the height direction of the vehicle, and the third mounting portion 43a may be joined to a portion of the front cross plate 7 adjacent to the second end portion 7b of the front cross plate 7 using fasteners, welding, and/or the like.

As illustrated in FIG. 5, the rear extension portion 43b may extend horizontally from a top end portion of the third mounting portion 43a toward the rear undercover 22 in the longitudinal direction of the vehicle. That is, the rear extension portion 43b may be perpendicular to the third mounting portion 43a.

The rear extension portion 43b may be aligned with the top surface of the front cross plate 7 or be located higher than the top surface of the front cross plate 7.

The third main mounting bracket 43 may have a plurality of mounting holes 43c provided in the third mounting portion 43a and the rear extension portion 43b, and a plurality of nuts 43d may be aligned with the plurality of mounting holes 43c, respectively. Each nut 43d may be welded to an edge portion of each mounting hole 43c.

Figure 9:
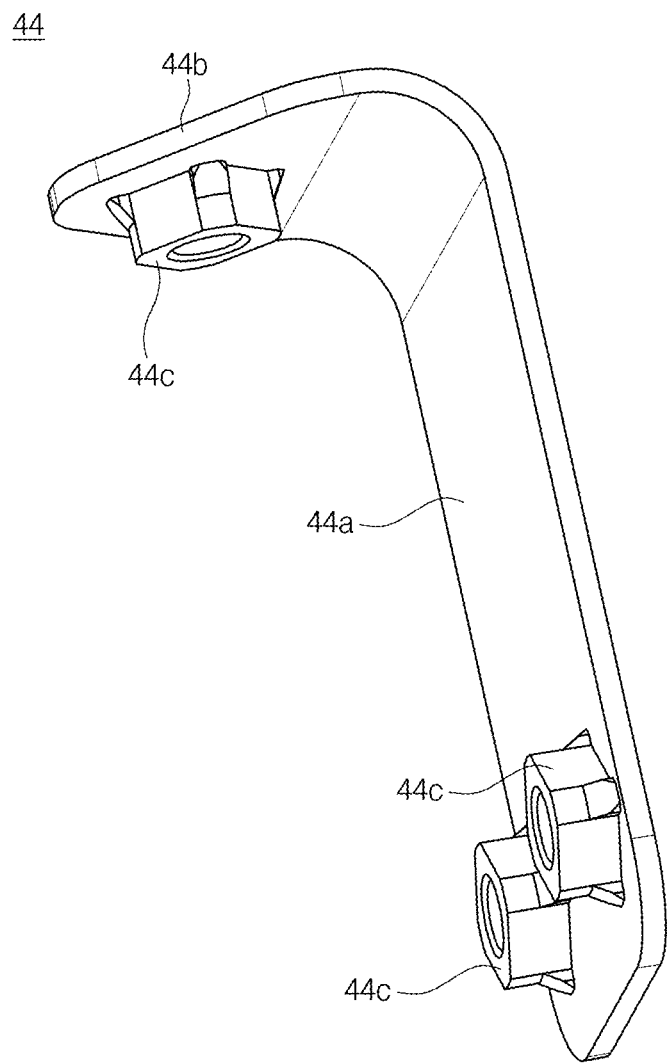
FIG. 9 illustrates a perspective view of a fourth main mounting bracket of a vehicle undercover structure according to an exemplary embodiment of the present disclosure.

Referring to FIG. 9, the fourth main mounting bracket 44 may include a fourth mounting portion 44a mounted on the rear cross plate 8, and a front extension portion 44b extending from the fourth mounting portion 44a toward the front of the vehicle.

The fourth mounting portion 44a may be flattened and extend in the height direction of the vehicle, and the fourth mounting portion 44a may be joined to a portion of the rear cross plate 8 adjacent to the second end portion 8b of the rear cross plate 8 using fasteners, welding, and/or the like.

As illustrated in FIG. 5, the front extension portion 44b may extend horizontally from a top end portion of the fourth mounting portion 44a toward the front undercover 21 in the longitudinal direction of the vehicle. That is, the front extension portion 44b may be perpendicular to the fourth mounting portion 44a.

The front extension portion 44b may be aligned with the top surface of the rear cross plate 8 or be located higher than the top surface of the rear cross plate 8.

The fourth main mounting bracket 44 may have a plurality of mounting holes 44c provided in the fourth mounting portion 44a and the front extension portion 44b, and a plurality of nuts 44d may be aligned with the plurality of mounting holes 44c, respectively. Each nut 44d may be welded to an edge portion of each mounting hole 44c.

The first mounting portion 41a of the first main mounting bracket 41 and the third mounting portion 43a of the third main mounting bracket 43 may be mounted on the rear surface of the front cross plate 7, and the second mounting portion 42a of the second main mounting bracket 42 and the fourth mounting portion 44a of the fourth main mounting bracket 44 may be mounted on the front surface of the rear cross plate 8. Referring to FIG. 5, the first main mounting bracket 41 may face the second main mounting bracket 42 in the longitudinal direction of the vehicle, and accordingly the rear extension portion 41c of the first main mounting bracket 41 and the front extension portion 42b of the second main mounting bracket 42 may face each other between the front cross plate 7 and the rear cross plate 8. The rear extension portion 41c of the first main mounting bracket 41 and the front extension portion 42b of the second main mounting bracket 42 may be located above the moving component such as the lateral rod 6. The third main mounting bracket 43 may face the fourth main mounting bracket 44 in the longitudinal direction of the vehicle, and accordingly the rear extension portion 43b of the third main mounting bracket 43 and the front extension portion 44b of the fourth main mounting bracket 44 may face each other between the front cross plate 7 and the rear cross plate 8. The rear extension portion 43b of the third main mounting bracket 43 and the front extension portion 44b of the fourth main mounting bracket 44 may be located above the moving component such as the lateral rod 6.

Figure 11:
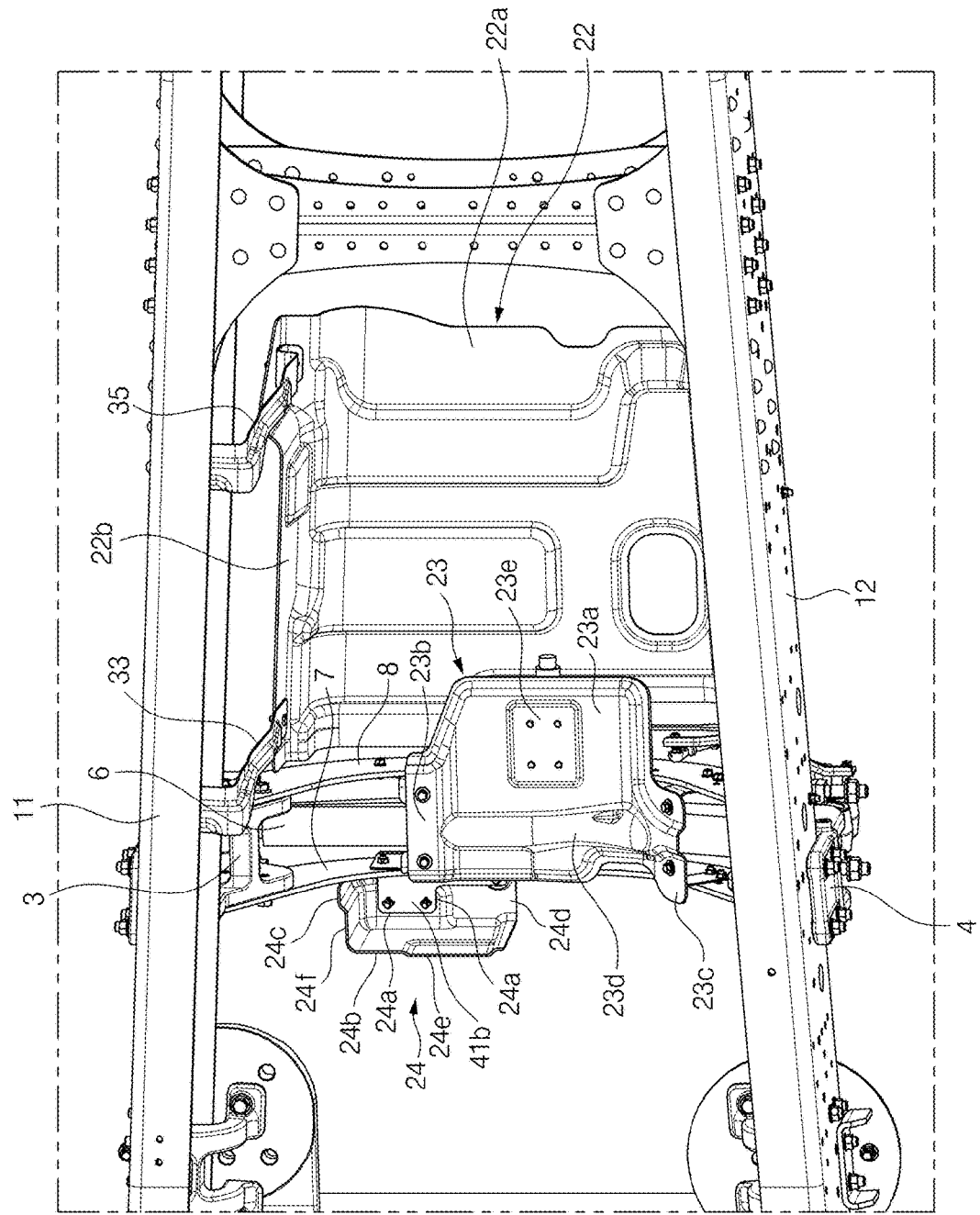
FIG. 11 illustrates a perspective view of a main undercover, an auxiliary undercover, and a rear undercover mounted on a vehicle undercover structure according to an exemplary embodiment of the present disclosure.

Referring to FIG. 11, the main undercover 23 may include a bottom wall 23a and two mounting walls 23b and 23c connected to both sides of the bottom wall 23a.

Referring to FIGS. 3 and 11, the main undercover 23 may have a raised portion 23d which is raised from the bottom wall 23a. The raised portion 23d may be raised upwardly from the bottom wall 23a so that a bottom surface thereof may not interfere with a top portion of the moving component such as the lateral rod 6. Referring to FIG. 3, the raised portion 23d may have a curved cross section corresponding to the top portion of the lateral rod 6, and accordingly the lateral rod 6 may not contact with the bottom surface of the raised portion 23*d* even when the lateral rod 6 is in the upper limit position.

Figure 17:
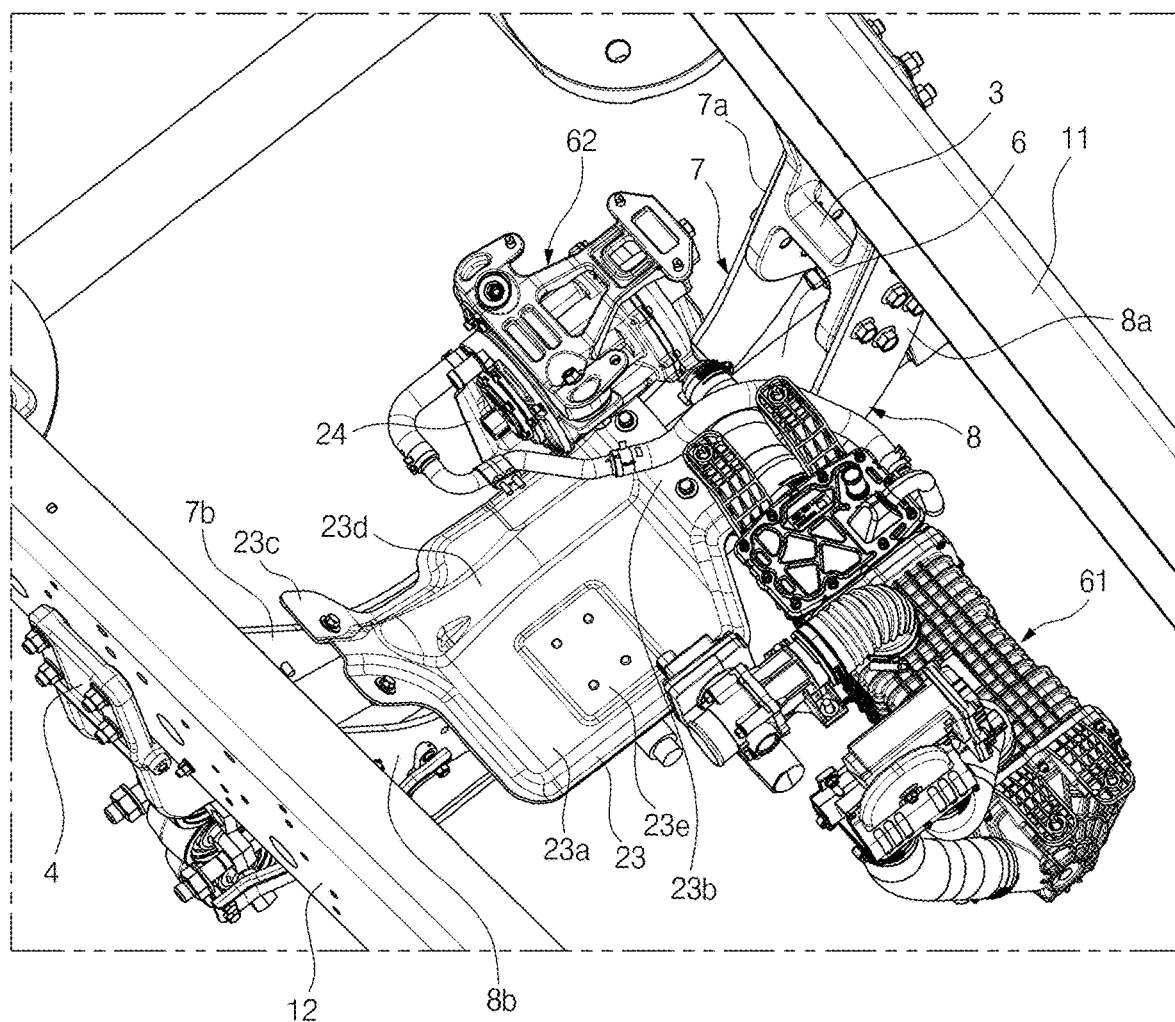
FIG. 17 illustrates a perspective view of the arrangement of a fuel cell power module and an air compressor on a vehicle undercover structure according to an exemplary embodiment of the present disclosure.

Referring to FIGS. 11 and 17, the main undercover 23 may further include a mounting surface 23*e* raised upwardly from the bottom wall 23*a*, and the mounting surface 23*e* may have a predetermine area so that it may contact with a bottom surface of a vehicle component. The mounting surface 23*e* may have a plurality of mounting holes, and the vehicle component may be mounted on the mounting surface 23*e* through a plurality of fasteners. For example, as illustrated in FIG. 18, the BPCU 63 may be securely joined to the mounting surface 23*e* of the bottom wall 23*a* through the plurality of fasteners. Because the mounting surface 23*e* is raised upwardly from the bottom wall 23*a*, stiffness of the main undercover 23 itself may be improved, and mounting stiffness of the vehicle component may be improved.

The two mounting walls 23*b* and 23*c* may include a first mounting wall 23*b* joined to the first main mounting bracket 41 and the second main mounting bracket 42, and a second mounting wall 23*c* joined to the third main mounting bracket 43 and the fourth main mounting bracket 44. The first mounting wall 23*b* may be joined to the rear extension portion 41*c* of the first main mounting bracket 41 and the front extension portion 42*b* of the second main mounting bracket 42 through fasteners. The second mounting wall 23*c* may be joined to the rear extension portion 43*b* of the third main mounting bracket 43 and the front extension portion 44*b* of the fourth main mounting bracket 44 through fasteners.

Referring to FIG. 2 and FIG. 3, the rear cross plate 8 may further include a support bracket 9 mounted on the rear surface thereof. The support bracket 9 may support the bottom wall 23*a* of the main undercover 23. Accordingly, a front portion of the main undercover 23 may be supported to the front cross plate 7 and the rear cross plate 8 by the plurality of main mounting brackets 41, 42, 43, and 44, and a rear portion of the main undercover 23 may be supported to the support bracket 9 by the support bracket 9.

Referring to FIG. 1, FIG. 2, FIG. 3, FIG. 4, and FIG. 5, the vehicle undercover structure according to an exemplary embodiment of the present disclosure may further include an auxiliary undercover 24 located in front of the main undercover 23. The auxiliary undercover 24 may be securely mounted on the first main mounting bracket 41.

Referring to FIG. 11, the auxiliary undercover 24 may include a bottom wall 24*a*, a front wall 24*b* facing the front of the vehicle, and a sidewall 24*f* facing the side of the vehicle. The opposite of the sidewall 24*f* of the auxiliary undercover 24 may be opened. The rear of the auxiliary undercover 24 may be open to the rear of the vehicle. The right side of the auxiliary undercover 24 may be open to the second side rail 12 of the vehicle body frame 10, and the rear of the auxiliary undercover 24 may be open to the main undercover 23 and the front cross plate 7.

Figure 10:
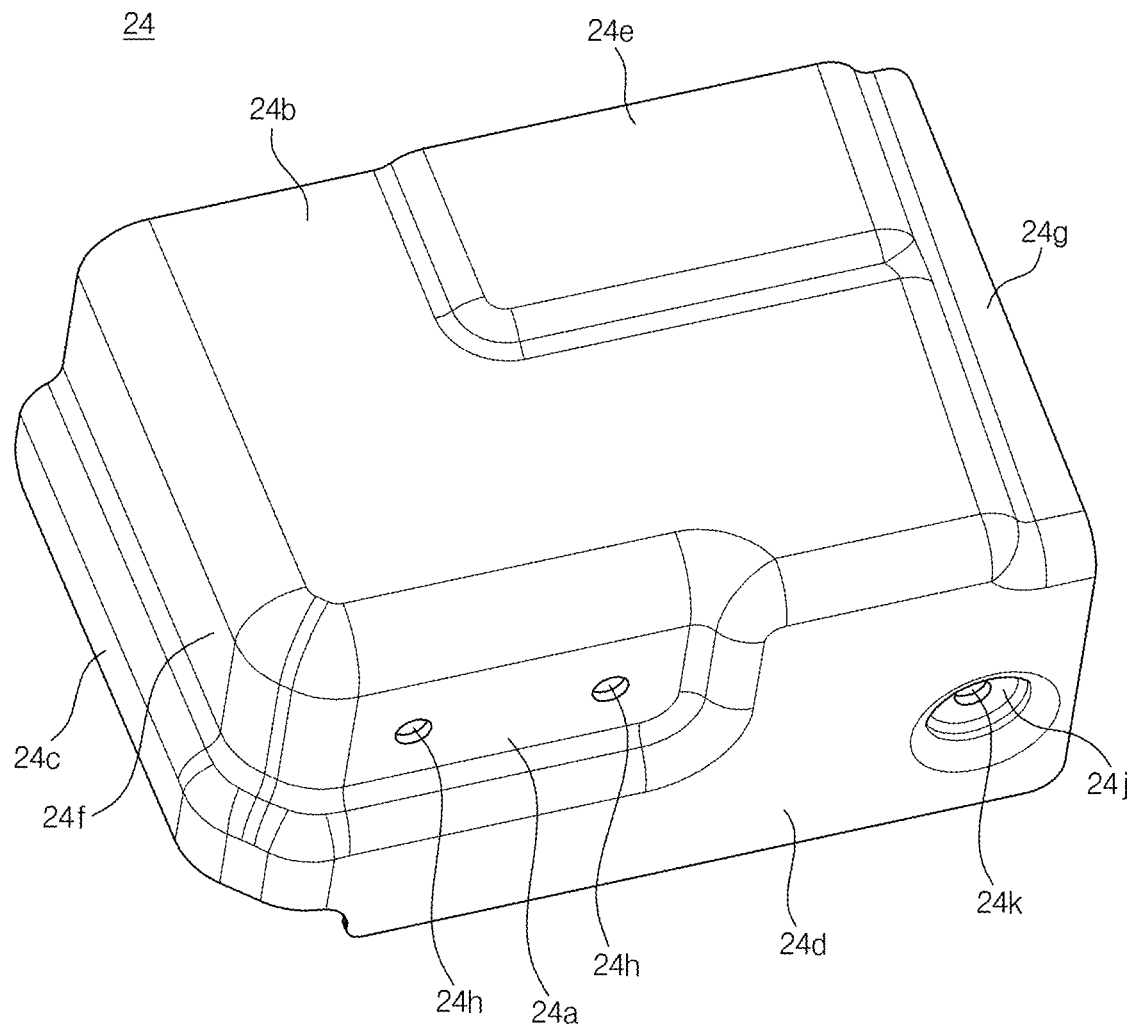
FIG. 10 illustrates a perspective view of an auxiliary undercover of a vehicle undercover structure according to an exemplary embodiment of the present disclosure.
Figure 14:
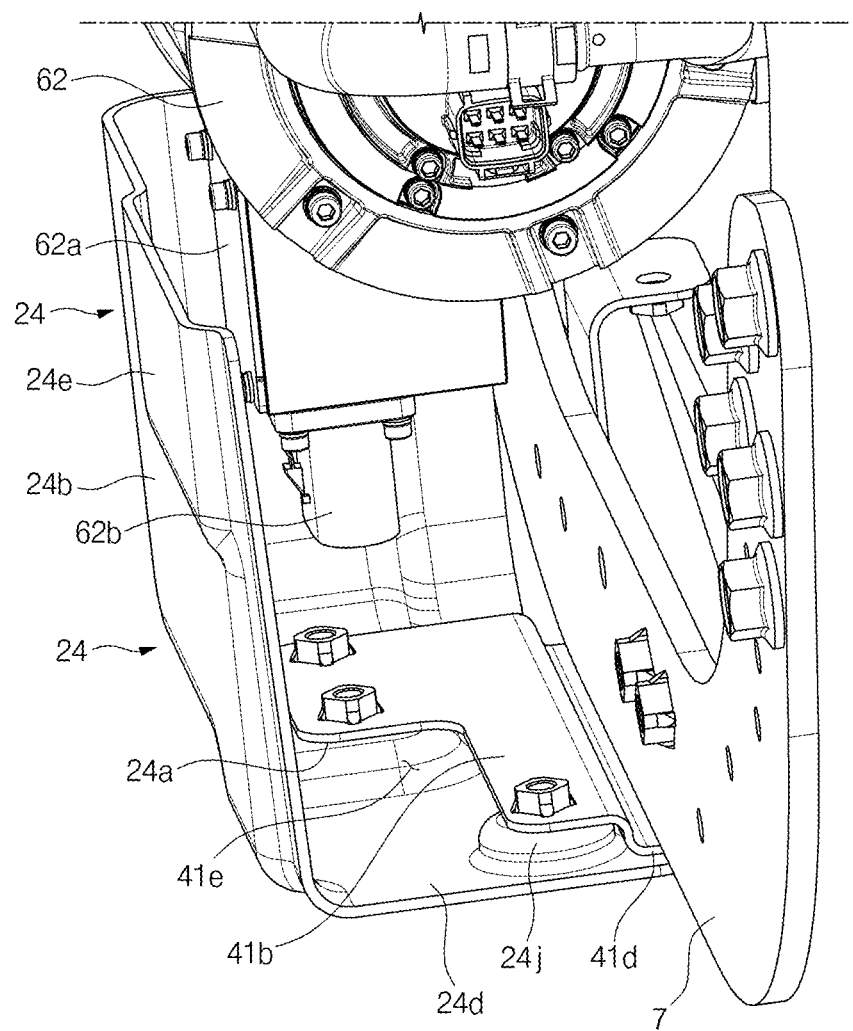
FIG. 14 illustrates a perspective view of a state in which an auxiliary undercover covers an air compressor in a vehicle undercover structure according to an exemplary embodiment of the present disclosure.
Figure 15:
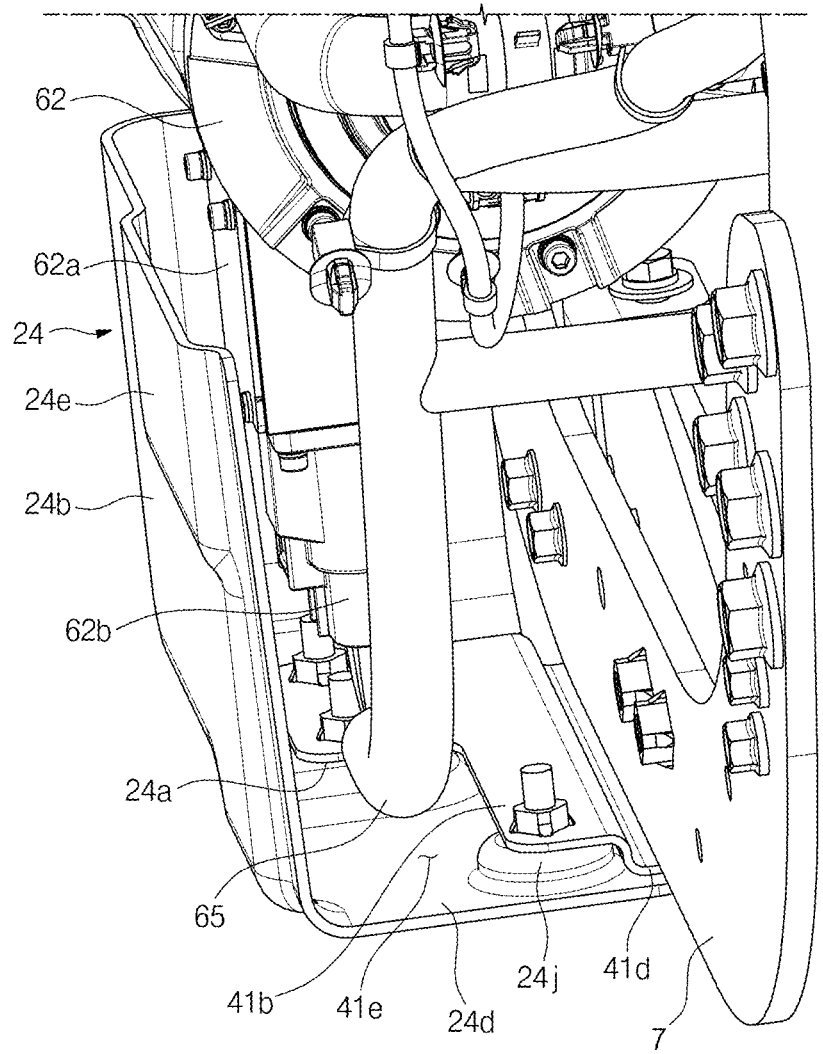
FIG. 15 illustrates a perspective view of a state in which a power cable is connected to a connector of the air compressor illustrated in FIG. 14.
Figure 16:
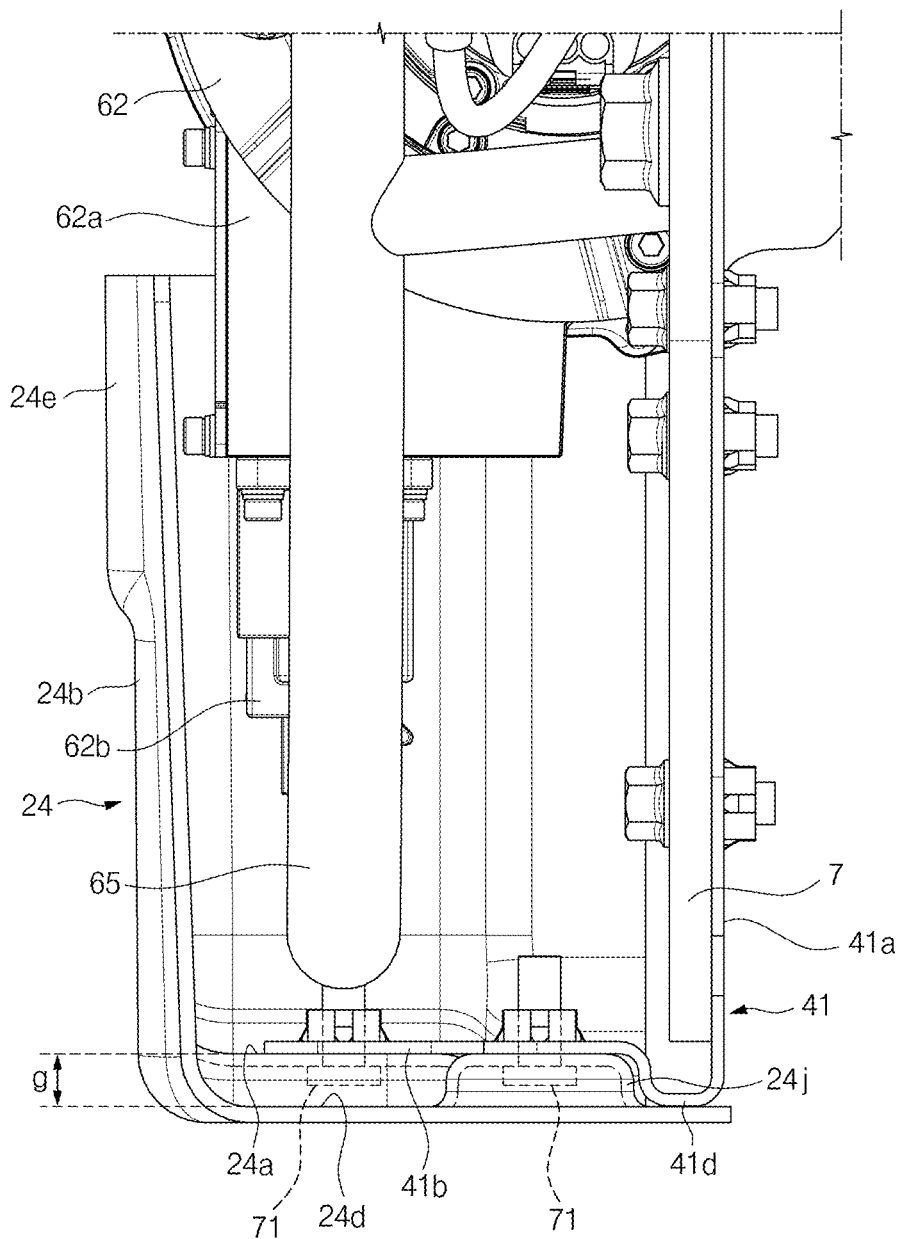
FIG. 16 illustrates a side view of a state in which an auxiliary undercover covers an air compressor in a vehicle undercover structure according to an exemplary embodiment of the present disclosure.

Referring to FIG. 14, FIG. 15 and FIG. 16, the bottom wall 24*a* may be joined to the front extension portion 41*b* of the first main mounting bracket 41 through fasteners. That is, the main undercover 23 and the auxiliary undercover 24 may be mounted together on the first main mounting bracket 41, and thus the main undercover 23 and the auxiliary undercover 24 may be stably supported to the front cross plate 7 and the rear cross plate 8 through the first main mounting bracket 41. Referring to FIG. 10, mounting holes 24*h* may be provided in the bottom wall 24*a*, bolts pass though mounting holes 24*h*.

The front wall 24*b* may face the front undercover 21, and the rear of the auxiliary undercover 24 opposite to the front wall 24*b* may be open to the main undercover 23.

Referring to FIG. 14, FIG. 15 and FIG. 16, the front wall 24*b* may have a raised portion 24*e* which is raised toward the front of the vehicle.

The sidewall 24*f* may face the first side rail 11 of the vehicle body frame 10, and the right side of the auxiliary undercover 24 opposite to the sidewall 24*c* may be open to the second side rail 12. The sidewall 24*f* may be aligned with the bottom wall 24*a*, and the sidewall 24*f* may be continuously connected to the bottom wall 24*a* at a right angle.

Referring to FIG. 14, FIG. 15 and FIG. 16, the auxiliary undercover 24 may further include a recessed wall 24*d* which is recessed downwardly from the bottom wall 24*a*. A distance g between the recessed wall 24*d* and the bottom wall 24*a* may be defined by the bent portion 41*d*, and the recessed wall 24*d* may be aligned with the cut-out portion 41*e* of the first main mounting bracket 41. The cut-out portion 41*e* of the first main mounting bracket 41 and the recessed wall 24*d* is configured as a drainage channel through which moisture flows downwards. A mounting boss 24*j* may be provided on the recessed wall 24*d*, the mounting boss 24*j* may protrude upwardly from the recessed wall 24, and a top surface of the mounting boss 24*j* may be flush with a top surface of the bottom wall 24*a*. Referring to FIG. 16, the mounting boss 24*j* may be contact with and coupled to the front extension portion 41*b* of the first main mounting bracket 41. The mounting boss 24*j* may have mounting hole 24*k* which bolt passes.

Referring to FIG. 16, a plurality of bolts 71 may fasten the bottom wall 24*a* and the mounting boss 24*j* of the auxiliary undercover 24 to the front extension portion 41*b* of the first main mounting bracket 41. A head of each bolt 71 may be covered by the recessed wall 24*d*, and accordingly the head of the bolt 71 may be prevented from protruding downwardly from the auxiliary undercover 24.

Referring to FIG. 10, the auxiliary undercover 24 may further include a recessed edge portion 24*g* provided on one edge portion of the front wall 24*b*, and the recessed edge portion 24*g* may extend in the height direction of the vehicle. The auxiliary undercover 24 may further include a lateral raised portion 24*c* which is raised from the sidewall 24*f* toward the outside of the auxiliary undercover 24, the lateral raised portion 24*c* may be aligned with the recessed wall 24*d*, and the lateral raised portion 24*c* may be continuously connected to the recessed wall 24*d* at a right angle. As the bottom wall 24*a* and the recessed wall 24*d* of the auxiliary undercover 24 is joined to the first main mounting bracket 41, the front wall 24*b* and the sidewall 24*c* of the auxiliary undercover 24 may be displaced or be deformed. To solve the present problem, the overall stiffness of the auxiliary undercover 24 may be increased by the recessed edge portion 24*g* and the lateral raised portion 24*c*, and thus displacement or deformation of the auxiliary undercover 24 may be prevented.

The auxiliary undercover 24 may cover a connector of an electric/electronic component and a power cable exposed under the vehicle body frame. Referring to FIG. 14, FIG. 15 and FIG. 16, the auxiliary undercover 24 may cover a connector port 62*b* of the electric/electronic component such as the air compressor 62. As illustrated in FIG. 15, a power cable 65 may be connected to the connector port 62*b* of the air compressor 62, and the auxiliary undercover 24 may cover the connector port 62*b* of the air compressor 62 and the power cable 65 with the bottom wall 24a, the front wall 24b, the sidewall 24f, the recessed wall 24d, and the lateral raised portion 24c.

Referring to FIG. 14, FIG. 15 and FIG. 16, the auxiliary undercover 24 may further include the raised portion 24e which is raised from the front wall 24b toward the front of the vehicle. Accordingly, the auxiliary undercover 24 may be prevented from directly contacting or interfering with a connector block 62a of the electric/electronic component such as the air compressor 62.

Referring to FIGS. 17 to 19, the fuel cell power module 61, the air compressor 62, and the BPCU 63 of the electric powertrain system of the fuel cell truck may be covered by the rear undercover 22, the main undercover 23, and the auxiliary undercover 24.

Referring to FIG. 19, the fuel cell power module 61 having a relatively large volume may be sufficiently covered by the rear undercover 22.

Referring to FIGS. 17 and 18, the BPCU 63 may be joined to the mounting surface 23e of the main undercover 23, and accordingly the BPCU 63 may be sufficiently covered by the main undercover 23. Connector ports 63a and 63b of the BPCU 63 may be covered by the main undercover 23 so that moisture may be prevented from entering the connector ports 63a and 63b of the BPCU 63.

Furthermore, various vehicle components such as transmission and an engine may be mounted on the vehicle body frame 10, and various vehicle components may be safely covered by the rear undercover 22, the main undercover 23, and the auxiliary undercover 24 around the moving component so that foreign objects, moisture, etc. may be prevented from entering the vehicle components.

The vehicle undercover structure according to an exemplary embodiment of the present disclosure may prevent moisture from entering the connector ports of the electric/electronic components, preventing electric short circuits of the electric/electronic components which may be a hindrance to the operation of the vehicle. The vehicle undercover structure may meet the vehicle's minimum ground clearance for obstacle avoidance conditions.

As set forth above, the vehicle undercover structure according to exemplary embodiments of the present disclosure may be designed to cover the moving component which is movable along a predetermined movement path on the vehicle body frame, improving watertightness and electrical safety with respect to the electric/electronic components mounted on the vehicle body frame.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle undercover structure, comprising:
   a vehicle body frame including a first side rail and a second side rail spaced from each other in a width direction of a vehicle; and
   a main undercover disposed above a moving component which is movable between an upper limit position and a lower limit position on the vehicle body frame.

2. The vehicle undercover structure of claim 1, further including at least one cross plate adjacent to the moving component,
   wherein the at least one cross plate extends in the width direction of the vehicle, and
   wherein the main undercover is mounted on the at least one cross plate through a main mounting bracket.

3. The vehicle undercover structure of claim 2,
   wherein the at least one cross plate includes a front cross plate located in front of the moving component, and a rear cross plate located behind the moving component,
   wherein the upper limit position of the moving component is lower than a top surface of the front cross plate and a top surface of the rear cross plate, and
   wherein the main undercover is mounted on the front cross plate and the rear cross plate through the main mounting bracket.

4. The vehicle undercover structure of claim 1,
   wherein the main undercover includes a bottom wall and a raised portion provided on the bottom wall, and
   wherein the raised portion is raised upwardly from the bottom wall to prevent a bottom surface thereof from interfering with a top portion of the moving component.

5. The vehicle undercover structure of claim 3,
   wherein the main mounting bracket is a first main mounting bracket mounted on the front cross plate, and
   wherein the first main mounting bracket includes a first mounting portion mounted on the front cross plate, a front extension portion extending from a bottom end portion of the first mounting portion toward the front of the vehicle, and a rear extension portion extending from a top end portion of the first mounting portion toward the rear of the vehicle.

6. The vehicle undercover structure of claim 5, wherein the rear extension portion of the first main mounting bracket is located higher than the top surface of the front cross plate.

7. The vehicle undercover structure of claim 5, further including a second main mounting bracket mounted on the rear cross plate, a third main mounting bracket mounted on the front cross plate, and a fourth main mounting bracket mounted on the rear cross plate, wherein the first main mounting bracket faces the second main mounting bracket in a longitudinal direction of the vehicle, and wherein the third main mounting bracket faces the fourth main mounting bracket in the longitudinal direction of the vehicle.

8. The vehicle undercover structure of claim 7, wherein the second main mounting bracket includes a second mounting portion mounted on the rear cross plate, and a front extension portion extending from a top end portion of the second mounting portion toward the front of the vehicle.

9. The vehicle undercover structure of claim 8, wherein the front extension portion of the second main mounting bracket is located higher than the top surface of the rear cross plate.

10. The vehicle undercover structure of claim 7, wherein the third main mounting bracket includes a third mounting portion mounted on the front cross plate, and a rear extension portion extending from a top end portion of the third mounting portion toward the rear of the vehicle.

11. The vehicle undercover structure of claim 10, wherein the rear extension portion of the third main mounting bracket is located higher than the top surface of the front cross plate.

12. The vehicle undercover structure of claim 7, wherein the fourth main mounting bracket includes a fourth mounting portion mounted on the rear cross plate, and a front extension portion extending from a top end portion of the fourth mounting portion toward the front of the vehicle.

13. The vehicle undercover structure of claim 12, wherein the front extension portion of the fourth main mounting bracket is located higher than the top surface of the rear cross plate.

14. The vehicle undercover structure of claim 5, wherein the first main mounting bracket further includes a bent portion provided at the bottom end portion of the first mounting portion, wherein the bent portion has a 'U'-shaped cross section, wherein the front extension portion of the first main mounting bracket is joined to the first mounting portion through the bent portion to form a unitary one-piece structure, and wherein the front extension portion of the first main mounting bracket is located higher than a bottom surface of the bent portion.

15. The vehicle undercover structure of claim 14, wherein the first main mounting bracket has a cut-out portion provided on the front extension portion of the first main mounting bracket.

16. The vehicle undercover structure of claim 2, further including an auxiliary undercover adjacent to a bottom end portion or a side of the main undercover, wherein the auxiliary undercover is mounted on the main mounting bracket.

17. The vehicle undercover structure of claim 16, wherein the auxiliary undercover includes a bottom wall, a front wall facing the front of the vehicle, and a sidewall facing a side of the vehicle, and wherein the bottom wall of the auxiliary undercover is joined to the main mounting bracket.

18. The vehicle undercover structure of claim 17, wherein the auxiliary undercover further includes a recessed wall which is recessed downwardly from the bottom wall, and wherein the recessed wall is aligned with a cut-out portion of the main mounting bracket.

19. The vehicle undercover structure of claim 17, wherein the auxiliary undercover further includes a recessed edge portion provided on one edge portion of the front wall, and wherein the recessed edge portion extends in a height direction of the vehicle.

20. The vehicle undercover structure of claim 18, the auxiliary undercover further includes a lateral raised portion which is raised from the sidewall toward the outside of the auxiliary undercover, and wherein the lateral raised portion is continuously connected to the recessed wall of the auxiliary undercover at a right angle.

* * * * *